(12) United States Patent
Ge

(10) Patent No.: US 6,768,554 B2
(45) Date of Patent: Jul. 27, 2004

(54) FRINGE ANALYSIS METHOD USING FOURIER TRANSFORM

(75) Inventor: Zongtao Ge, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 569 days.

(21) Appl. No.: 09/775,584

(22) Filed: Feb. 5, 2001

(65) Prior Publication Data

US 2001/0019635 A1 Sep. 6, 2001

(30) Foreign Application Priority Data

Feb. 16, 2000 (JP) ........................................ 2000-037777

(51) Int. Cl.$^7$ ................................................. G01B 9/02
(52) U.S. Cl. ....................................................... 356/512
(58) Field of Search ............................... 356/510, 511, 356/512, 513

(56) References Cited

U.S. PATENT DOCUMENTS 5,151,752 A * 9/1992 Oono et al. .................. 356/128
6,587,208 B2 * 7/2003 Maeda et al. ................ 356/496

OTHER PUBLICATIONS

Takeda, Mitsuo, "Subfringe Interferometry Fundamentals," *Kogaku*, Feb. 1984, pp. 55–65, vol. 13, No. 1.

* cited by examiner

Primary Examiner—Samuel A. Turner
Assistant Examiner—Michael A. Lyons
(74) Attorney, Agent, or Firm—Ronald R. Snider; Snider & Associates

(57) ABSTRACT

In a fringe analysis method comprising the step of subjecting fringe image data carrying wavefront information of an object to be observed to Fourier transform method so as to determine a wavefront of the object, the fringe image data is multiplied by a window function corresponding to an effective data area of the fringe image data before the Fourier transform method is applied to.

10 Claims, 18 Drawing Sheets

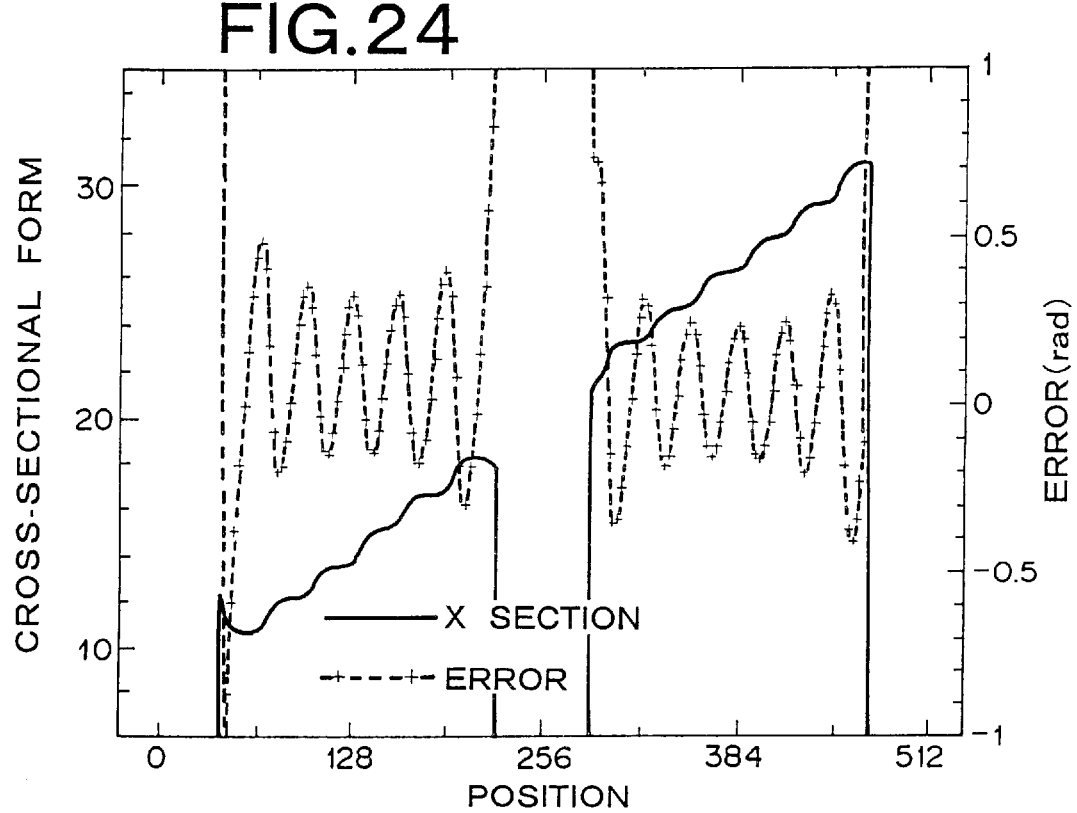
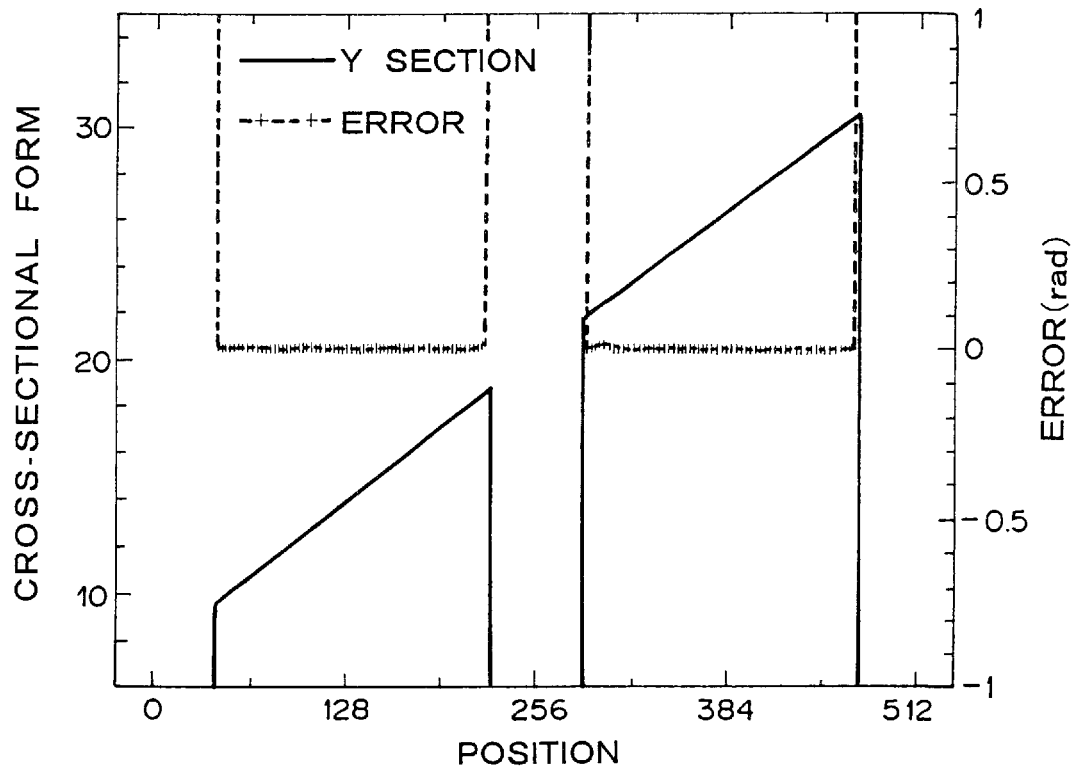

FRINGE ANALYSIS METHOD USING FOURIER TRANSFORM

RELATED APPLICATIONS

This application claims the priority of Japanese Patent Application No. 2000-037777 filed on Feb. 16, 2000, which is incorporated herein by reference.

BACKGROUND OF THE INVENTION

1. Field of the Invention

The present invention relates to a fringe analysis method using Fourier transform; and, in particular, to a fringe analysis method which can effectively use Fourier transform technique when analyzing image data having fringe patterns such as interference fringe patterns.

2. Description of the Prior Art

Light-wave interferometry has conventionally been known as important means concerning accurate measurement of wavefront. In recent years, there has been urgent need for developing an interferometry technique (sub-fringe interferometry) for reading out information from a fraction of a single interference fringe (one fringe) or less from the necessity to measure a surface or wavefront aberration of at an accuracy of ¹⁄₁₀ wavelength or higher.

For sub-fringe interferometry techniques, attention has been focused on techniques using Fourier transform method as disclosed in "Basics of Sub-fringe Interferometry," *Kogaku*, Vol. 13, No. 1 (February, 1984), pp. 55–65, for example.

However, Fourier transform method, which is excellent in principle, leaves some problems unsolved and has not always been effectively put into practice.

One of such problems lies in that a large error may occur in Fourier transform of an effective data area in fringe image data if the effective data area has a form different from that of the area subjected to Fourier transform method.

While the area subjected to Fourier transform method is typically the whole area of image data (having a rectangular form in general) obtained by imaging, results of Fourier transform method in the effective data area may include a large error if the form of effective data area is only a part (having a circular form, for example) of the whole area.

Therefore, in such a case, so-called masking processing may be applied to, in which the effective data area and the other area are multiplied by coefficients of 1 and 0, respectively, before carrying out Fourier transform method.

When fringe image data is subjected to such masking processing, a large gap (edge or discontinuity) may occur at the boundary between the effective and ineffective data areas. Since Fourier transform method does not always function effectively for data having such a gap (edge or discontinuity), its results of data analysis in the vicinity of the boundary may include an error larger than that yielded without the masking processing.

In particular, since the effective data area may vary greatly depending on the forms of wavefront and regions to be observed, a technique which minimizes the error is demanded. Techniques involving the above-mentioned masking processing have not been satisfactory yet from such a viewpoint as well.

SUMMARY OF THE INVENTION

In view of the circumstances mentioned above, it is an object of the present invention to provide a fringe analysis technique which can yield, in response to the wavefront of an effective data area in fringe image data, favorable analysis results of the effective data area with less errors after Fourier transform method.

The present invention provides a fringe analysis method using Fourier transform, the method comprising the step of subjecting fringe image data carrying wavefront information to be observed to Fourier transform method so as to determine the wavefront;

wherein, before the Fourier transform method is applied to, the fringe image data is multiplied by a window function corresponding to an effective data area of the fringe image data.

The wavefront information may be surface profile information of the object.

When the fringe image data is two-dimensional image data having a rectangular form, it is preferred that the window function be a function represented by variables indicating respective positions in two directions orthogonal to each other.

When the fringe image data is two-dimensional image data having a circular form, it is preferred that the window function be a function represented by a variable indicating a radial position from a center which is located at substantially the center position of the circular form.

The window function may have a form corresponding to that of the effective data area.

When the effective data area of the fringe image data has a form surrounding an effective data area in this case, it is preferred that the window function be a partial window function having a form corresponding to that of the effective data area.

As the partial window function, a ring type window function having a ring shape is used, for example.

The fringe image data may be interference fringe image data.

BRIEF DESCRIPTION OF THE DRAWINGS

FIG. 24 is a graph showing the form of an X cross-sectional form obtained when the image data shown in FIG. 22 is subjected to Fourier transform processing as it is, and the error from the actual form in this case;

FIG. 25 is a graph showing the form of a Y cross-sectional form obtained when the image data shown in FIG. 22 is subjected to Fourier transform processing as it is, and the error from the actual form in this case;

DESCRIPTION OF THE PREFERRED EMBODIMENTS

In the following, an embodiment of the method in accordance with the present invention will be explained in detail with reference to the accompanying drawings.

In this method, when Fourier transform method is used with respect to interference fringe image data of a wavefront to be observed, so as to analyze an interferogram of the wavefront, the image data is multiplied by a window function corresponding to the form of an effective data area in the image data, and then subjected to Fourier transform method, so as to reproduce the surface form (wavefront) of the object. Therefore, even if the effective data area of interference image data variously differs from the form of the area subjected to Fourier transform method, results of analysis of the effective data area after Fourier transform method can be obtained with less errors with respect to various forms.

Figure 2:
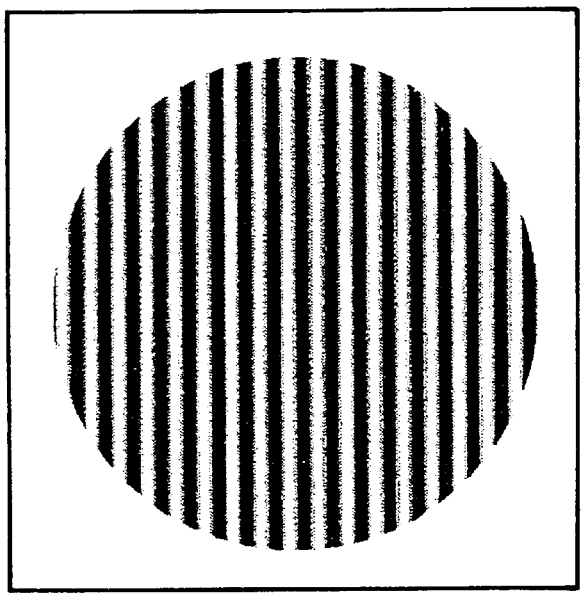
FIG. 2 is a schematic view showing (disk-shaped) interference fringe image data of an object to be observed.

A case where a disk-shaped object to be observed whose surface has a predetermined inclination with respect to X direction (sidewise in the paper surface) is measured by an interferometer, so that interference fringe image data shown in FIG. 2 is obtained, will now be studied.

Figure 3:
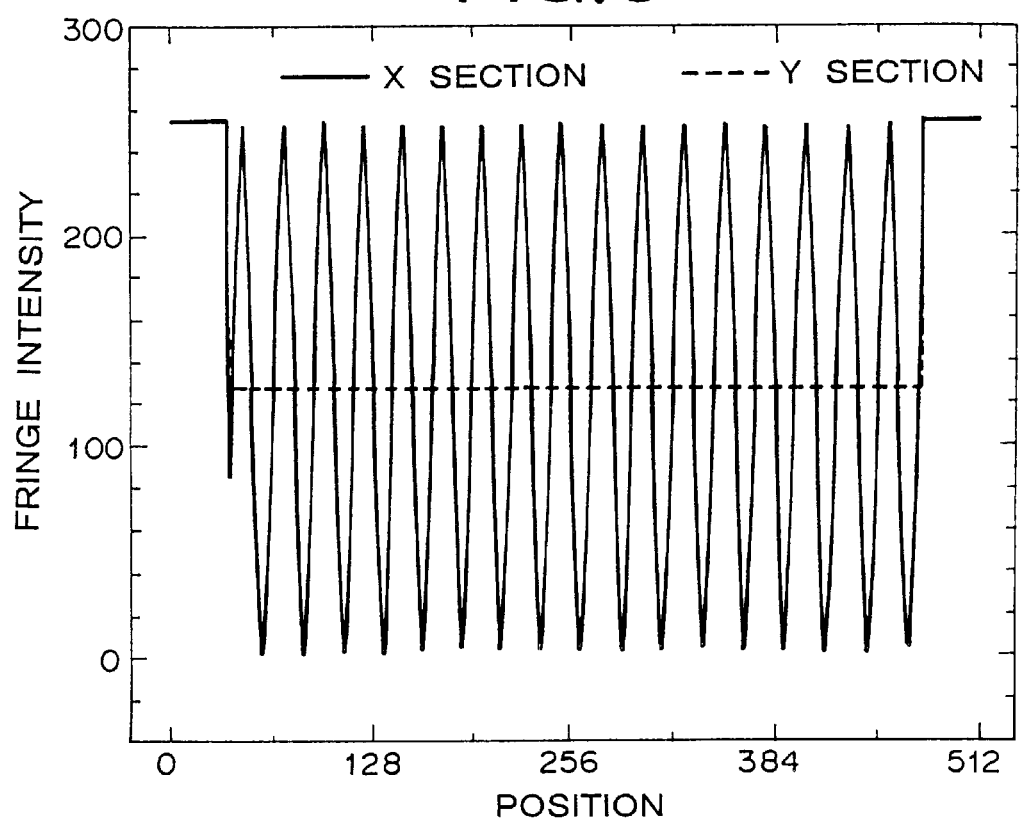
FIG. 3 is a graph showing a sectional interference fringe intensity distribution with respect to the image data shown in FIG. 2.

As can be seen from FIG. 3, the resulting interference fringe intensity has a periodic sinusoidal wave form in its X cross section.

Figure 4:
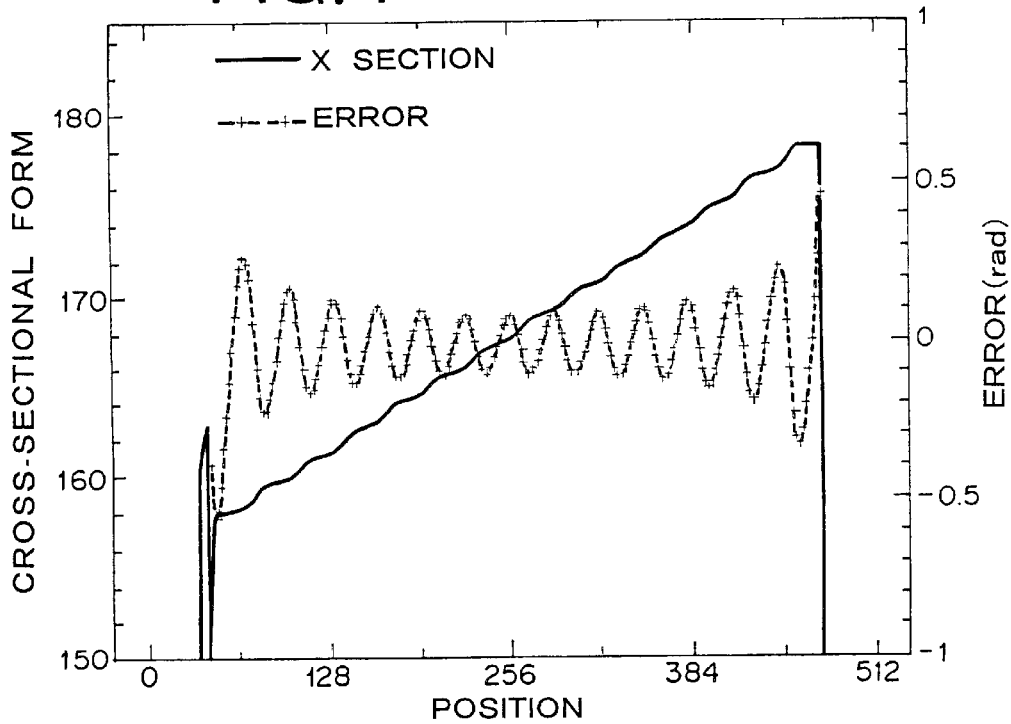
FIG. 4 is a graph showing the form of an X cross-sectional form obtained when the image data shown in FIG. 2 is subjected to Fourier transform processing as it is, and the error from the actual form in this case.
Figure 5:
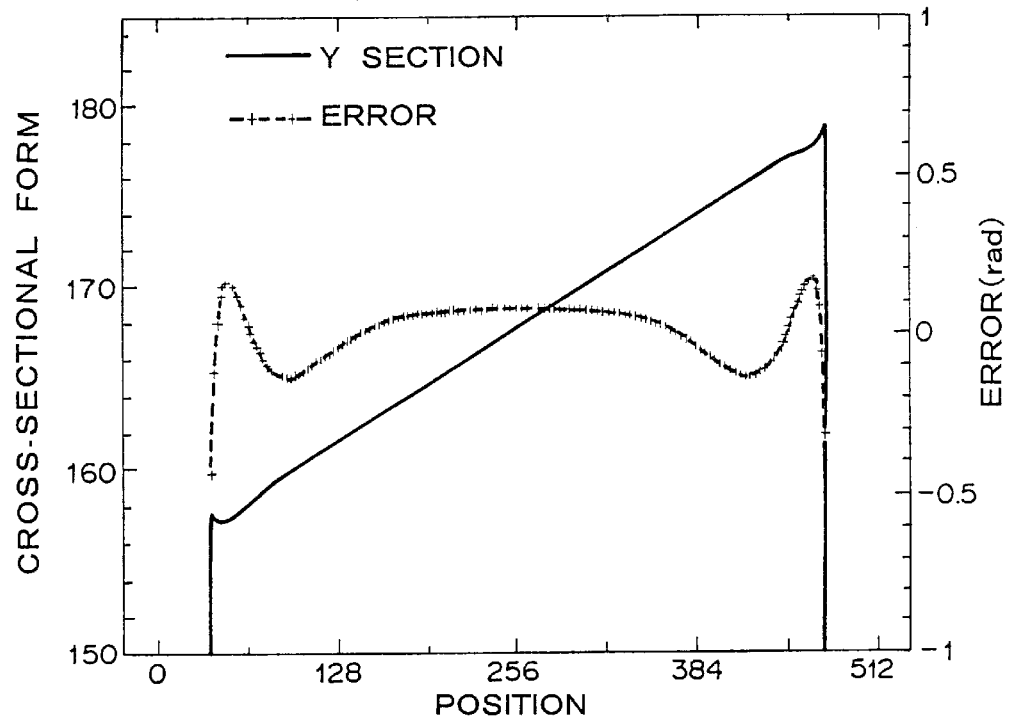
FIG. 5 is a graph showing the form of a Y cross-sectional form obtained when the image data shown in FIG. 2 is subjected to Fourier transform processing as it is, and the error from the actual form in this case.

FIGS. 4 and 5 show X and Y cross-sectional forms obtained when the image data shown in FIG. 2 is subjected to Fourier transform processing as it is, respectively, and the respective errors from the actual form in this case. Though it appears as if the object surface is inclined in FIG. 5 since a carrier signal having a predetermined frequency is superimposed in the Y-axis direction for convenience of analysis processing, the carrier signal has substantially no influence upon the results of analysis (the same being true in FIGS. 5, 7, 9, 11, 15, 17, 19, 21, 25, 27, 29, and 31).

As can be seen from FIGS. 4 and 5, an error of about ±0.1% to ±0.3% occurs in each of the X and Y cross-sectional forms when the image data is subjected to Fourier transform processing as it is.

Figure 33:
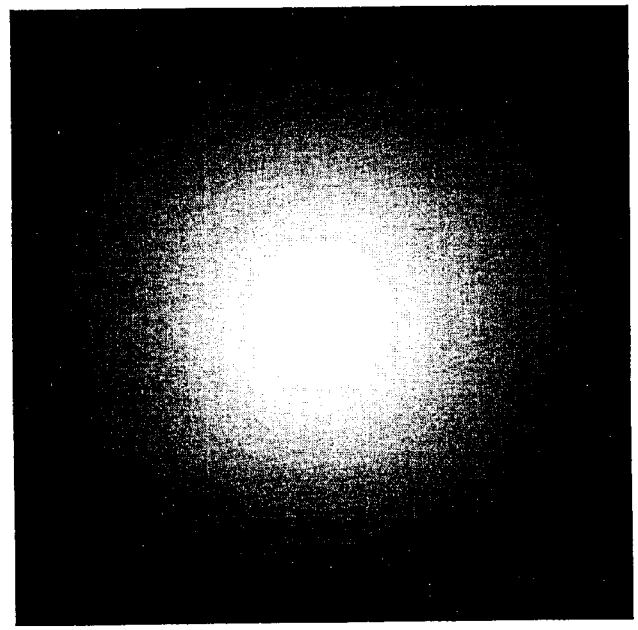
FIG. 33 is a schematic view showing a disk-shaped partial window function.

Therefore, in this embodiment, the image data shown in FIG. 2 is multiplied by a window function (a circular window function weighed heavier as nearer to the center part) shown in FIG. 33 corresponding to the (circular) effective data area in the image data, and then the image data multiplied by the window function is subjected to Fourier transform processing, so as to analyze the surface form of the object.

Figure 6:
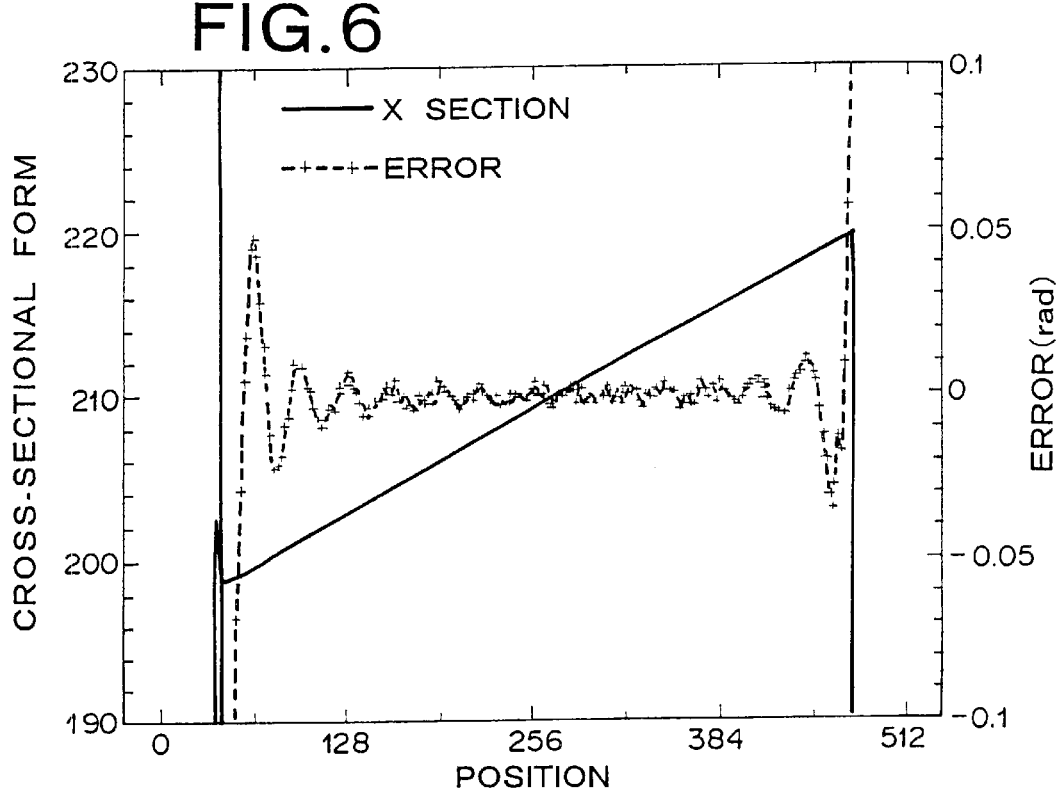
FIG. 6 is a graph showing the form of an X cross-sectional form obtained when the image data shown in FIG. 2 is subjected to Fourier transform processing after being multiplied by an X-Y directional window function, and the error from the actual form in this case.
Figure 7:
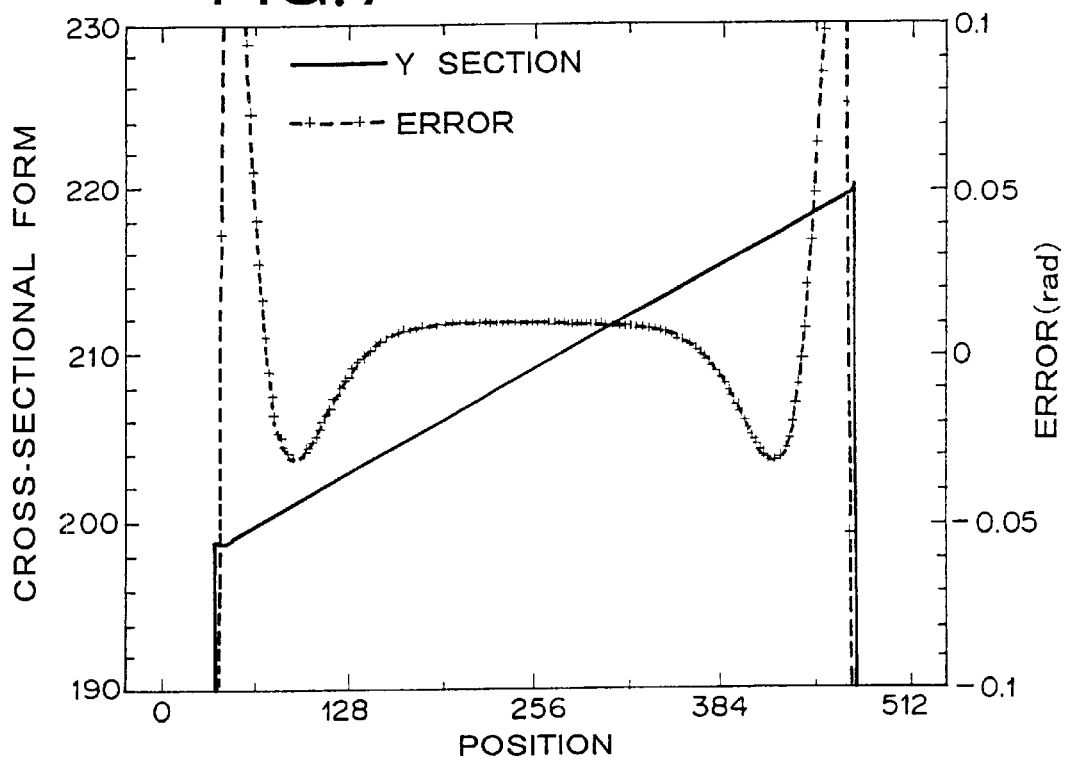
FIG. 7 is a graph showing the form of a Y cross-sectional form obtained when the image data shown in FIG. 2 is subjected to Fourier transform processing after being multiplied by the X-Y directional window function, and the error from the actual form in this case.

FIGS. 6 and 7 show thus obtained X and Y cross-sectional forms, respectively, and the respective errors from the actual form in this case. As can be seen from FIGS. 6 and 7, when the image data is subjected to Fourier transform processing after being multiplied by the window function, the error is about ±0.02% or less in each of the X and Y cross-sectional forms except for marginal portions of the effective area.

Thus, when multiplied by a window function, results of analysis of an effective data area of interference fringe image data obtained after Fourier transform processing can yield less errors even if the effective data area has a form different from that of the area subjected to Fourier transform processing.

This embodiment will now be explained in further detail.

X-Y Directional Window Function and Radial Window Function

Meanwhile, two-dimensional Fourier transform is two-dimensional integration, and respective Fourier transform operations in X and Y directions can usually be carried out independently from each other. When carrying out two-dimensional transform, a one-dimensional window function used in one-dimensional Fourier transform can be expanded to two dimensions, so as to use a window function represented by the following expression (1):

$$w(x,y) = w(x)w(y) \tag{1}$$

where w(x) and w(y) are one-dimensional window functions in X and Y directions, respectively.

Though such a window function is quite effective in analyzing rectangular objects to be observed, errors occurring due to discontinuity in marginal parts of a circular object to be observed are hard to reduce reliably when analyzing the circular object as can be seen from FIGS. 5 and 6.

When expanding a one-dimensional window function to two dimensions, on the other hand, it can be expanded not only in X-Y directions, but also in radial directions.

Therefore, as a two-dimensional window function, it is also possible to use the one expressed by the following expression (2):

$$w(x, y) = w(r) \tag{2}$$
$$= w(\sqrt{x^2 + y^2})$$

where w(r) is a one-dimensional window function.

A case where the image data shown in FIG. 2 is multiplied by the window function according to the above-mentioned expression (2), and then the image data multiplied by the window function is subjected to Fourier transform processing so as to analyze the fringe to be observed will now be studied.

Figure 8:
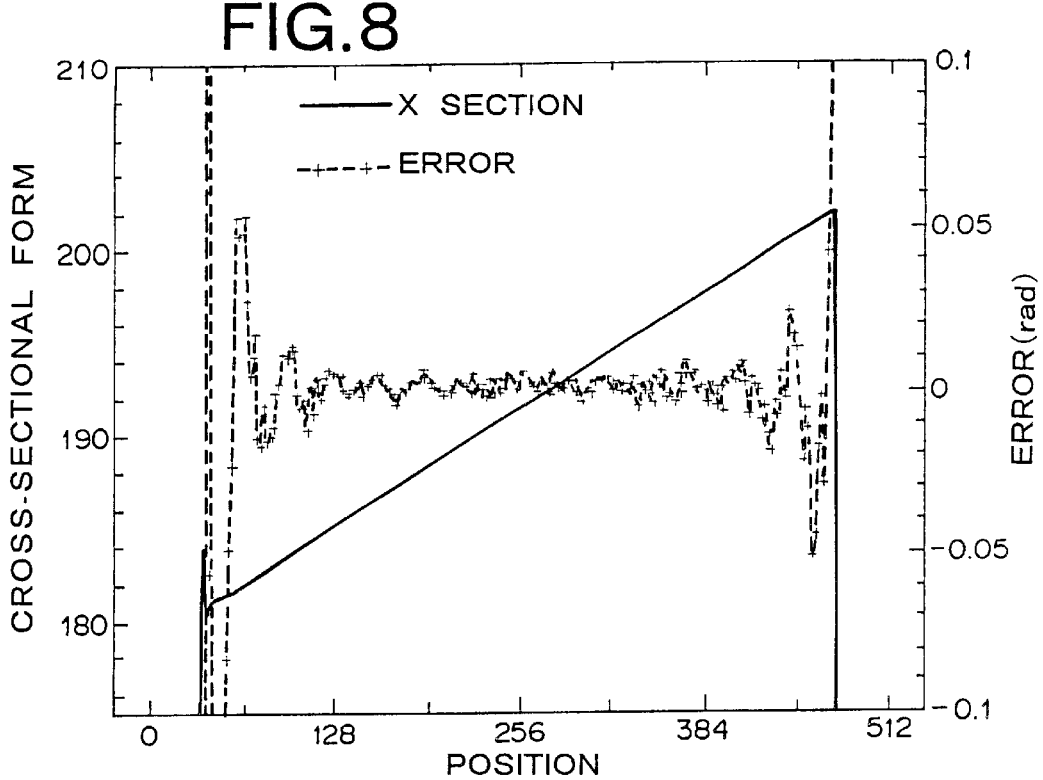
FIG. 8 is a graph showing the form of an X cross-sectional form obtained when the image data shown in FIG. 2 is subjected to Fourier transform processing after being multiplied by a radial total window function, and the error from the actual form in this case.
Figure 9:
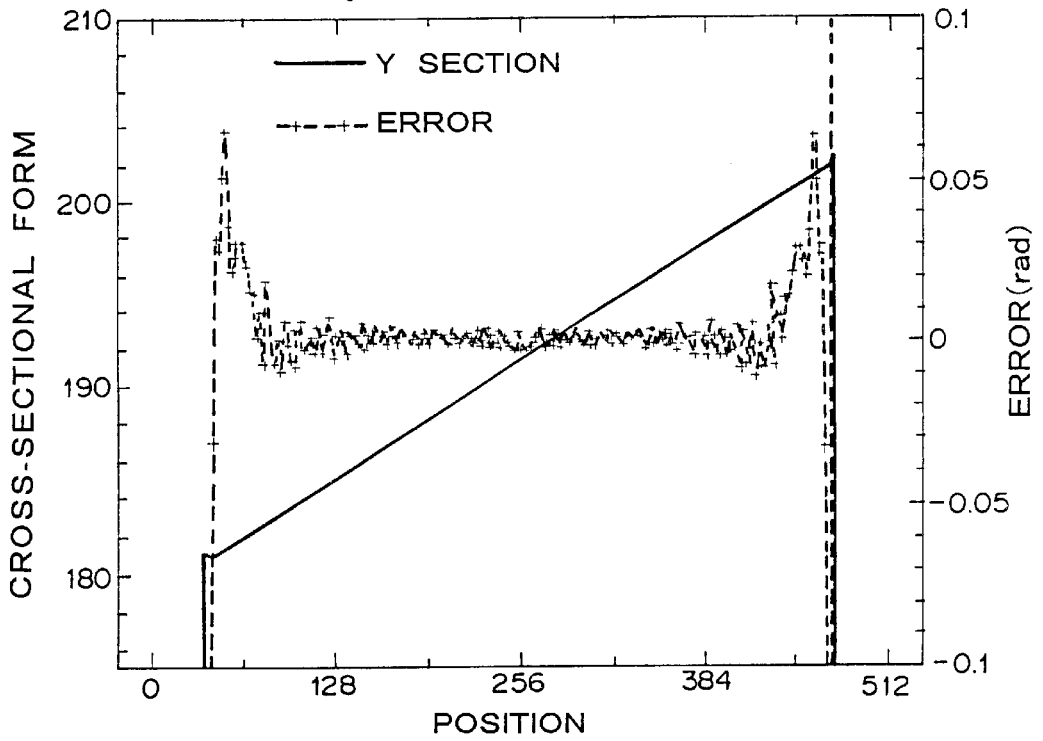
FIG. 9 is a graph showing the form of a Y cross-sectional form obtained when the image data shown in FIG. 2 is subjected to Fourier transform processing after being multiplied by the radial total window function, and the error from the actual form in this case.

FIGS. 8 and 9 show thus obtained X and Y cross-sectional forms, respectively, and the respective errors from the actual form in this case. As can be seen from FIGS. 8 and 9, if a window function two-dimensionally expanded in a radial direction is employed, then errors in marginal portions of a Y cross-sectional form can be ameliorated in particular, whereby analysis errors in a major part of marginal portions of the effective area in the Y cross-sectional form can be suppressed to about ±0.06% or less.

Thus, a window function which is two-dimensionally expanded in a radial direction is more effective with respect to disk-shaped objects to be observed.

In the case where the object to be observed has a rectangular form, the window function two-dimensionally expanded in X-Y directions according to the above-mentioned expression (1) is more effective.

Total Window Function and Partial Window Function

The whole analysis data area is multiplied by a window function in general. If ineffective data is included in an analysis data area, however, it is hard to reduce analysis errors occurring due to a discontinuous portion at the boundary between the effective and ineffective data areas as mentioned above.

Therefore, in this embodiment, only the effective data area is multiplied by a window function. Namely, a window function having a form corresponding to that of the effective data area is used. A window function corresponding to only a part (effective area) in the analysis data area as such is referred to as partial window function. By contrast, a window function having a form corresponding to that of the whole analysis data area is referred to as total window function.

For example, if the interference fringe image data of a disk-shaped object to be observed such as that shown in FIG. 2 is multiplied by a radial partial window function before being analyzed, then analysis errors occurring due to a discontinuous portion at the boundary between the effective and ineffective data areas can be reduced.

Figure 10:
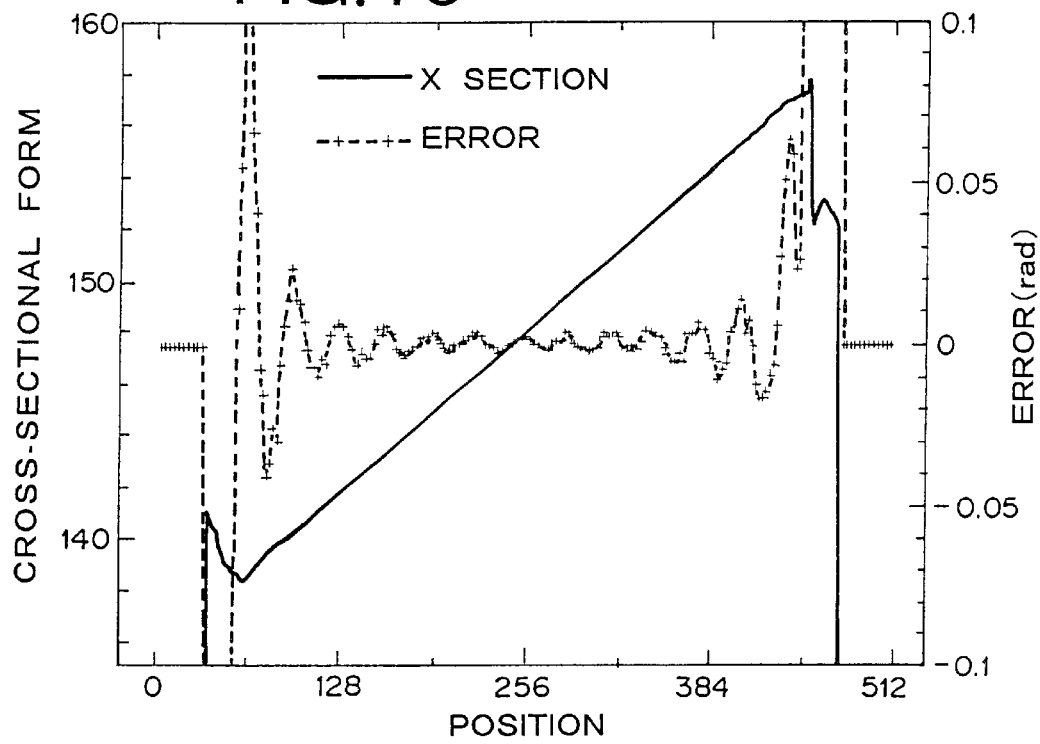
FIG. 10 is a graph showing the form of an X cross-sectional form obtained when the image data shown in FIG. 2 is subjected to Fourier transform processing after being multiplied by a radial partial window function, and the error from the actual form in this case.
Figure 11:
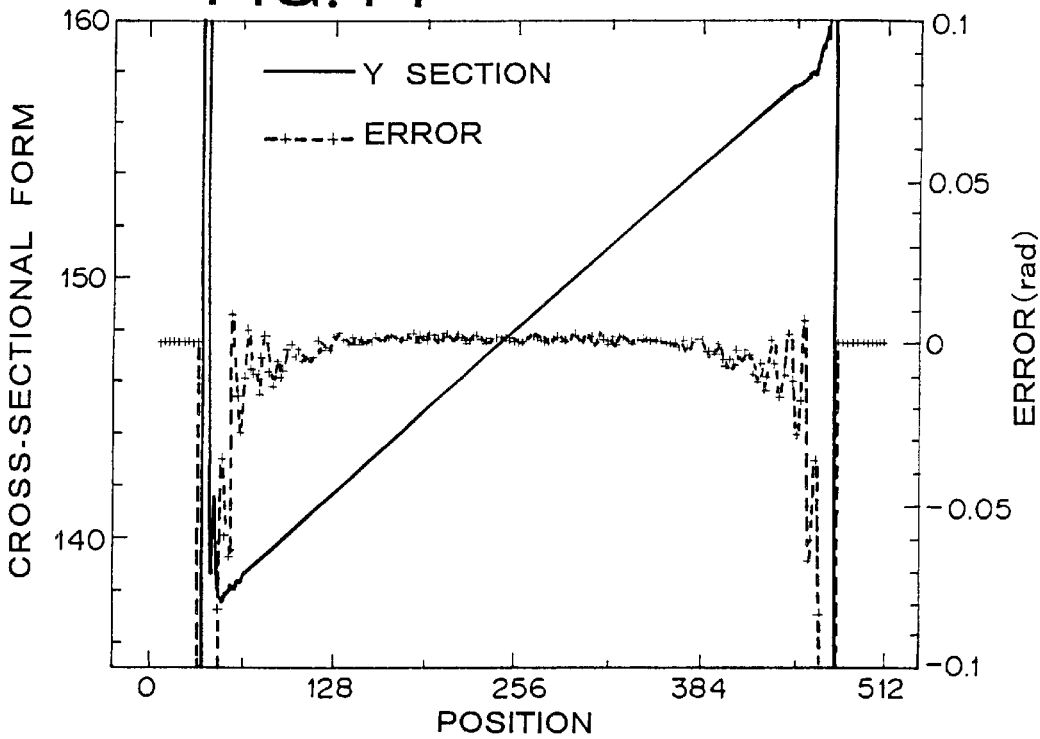
FIG. 11 is a graph showing the form of a Y cross-sectional form obtained when the image data shown in FIG. 2 is subjected to Fourier transform processing after being multiplied by the radial partial window function, and the error from the actual form in this case.

FIGS. 10 and 11 show thus obtained X and Y cross-sectional forms, respectively, and the respective errors from the actual form in this case. The window function in this case is a radial partial window function, whereas the forms and errors shown in FIGS. 8 and 9 are obtained when the window function is set to a radial total window function.

As can be seen when the graphs are compared with each other, the total error from the actual form in the Y cross-sectional form is ameliorated in particular when the partial window function is used.

In the case where an ineffective data area is included in an analysis area in interference image data of a rectangular object to be observed, analysis errors occurring due to a discontinuous portion at the boundary between the effective and ineffective data areas can be reduced if the image data is multiplied by an X-Y directional partial window function before analysis.

Ring-Shaped Window Function

When analyzing interference fringe image data of a ring-shaped object to be observed, favorable results may not always be obtained even if a window function such as one shown in FIG. 33 is applied thereto. In interference fringe image data of a ring-shaped object to be observed shown in FIG. 12 (FIG. 13 showing the intensity distribution of this interference fringe image data in X and Y cross sections), ineffective data areas exist in both of the outside and inside of the effective area. As a consequence, even when a disk-shaped partial window function such as the one shown in FIG. 33 is used, a large error occurs as a whole due to Fourier transform processing in the discontinuous region at the inner boundary.

Therefore, in this embodiment, a ring-shaped window function for smoothing the discontinuous regions on both sides is used for reducing the influences of the discontinuous regions on both sides.

Figure 34:
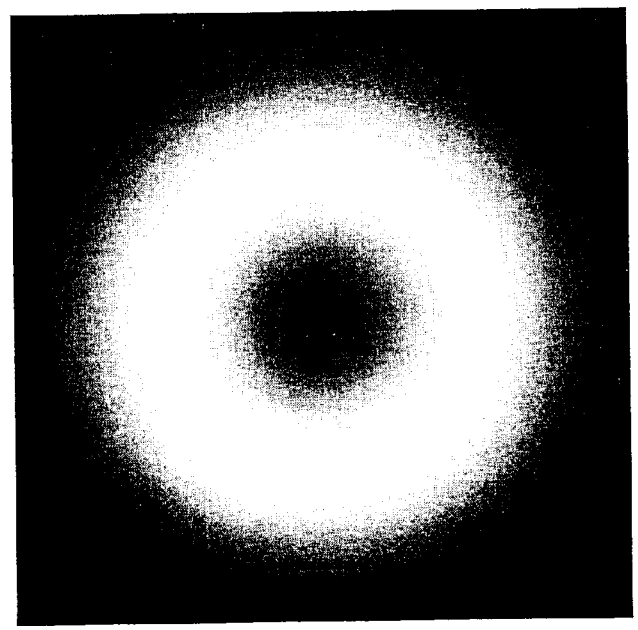
FIG. 34 is a schematic view showing a ring-shaped partial window function.

FIG. 34 shows a schematic form of this ring-shaped window function. As can be seen from FIG. 34, value becomes smaller as nearer to the inner and outer ineffective areas.

Figure 12:
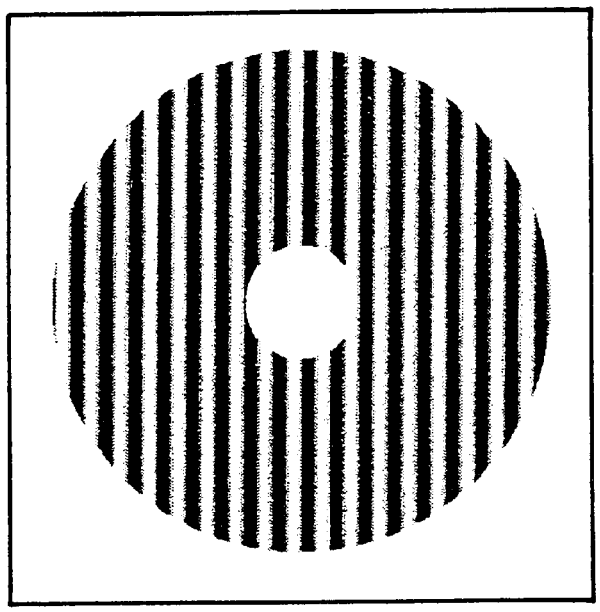
FIG. 12 is a schematic view showing (ring-shaped) interference fringe image data of an object to be observed.
Figure 13:
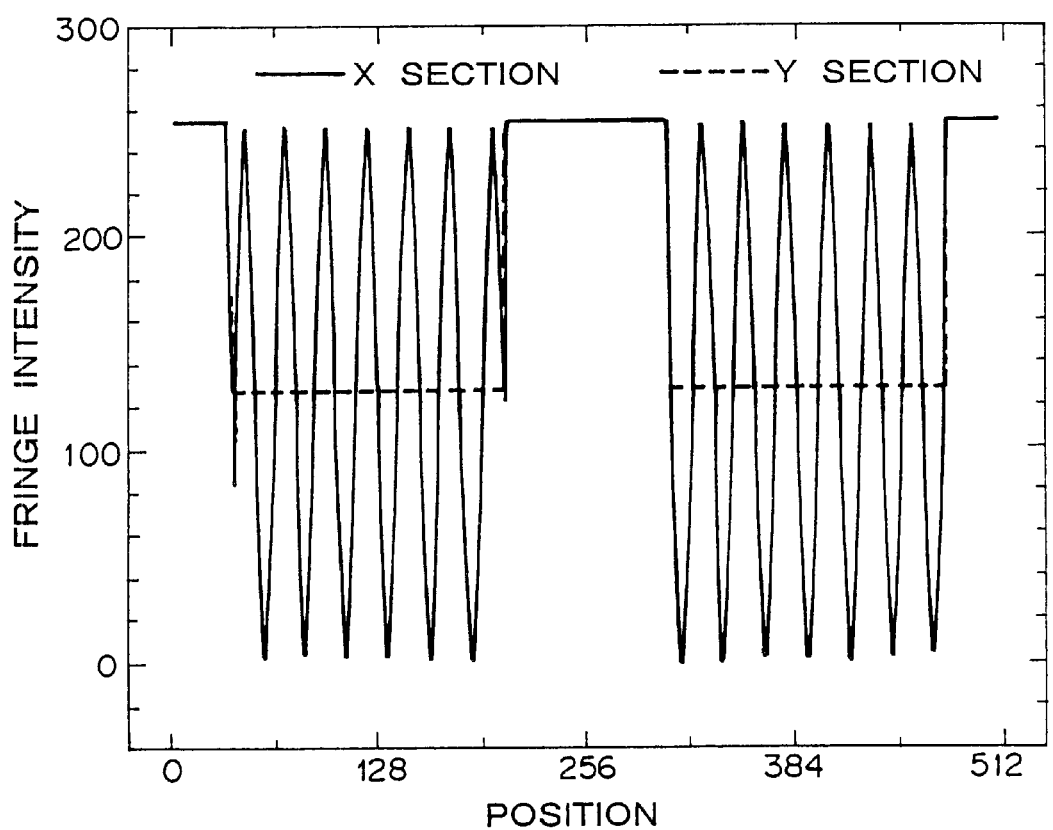
FIG. 13 is a graph showing a sectional interference fringe intensity distribution with respect to the image data shown in FIG. 12.
Figure 14:
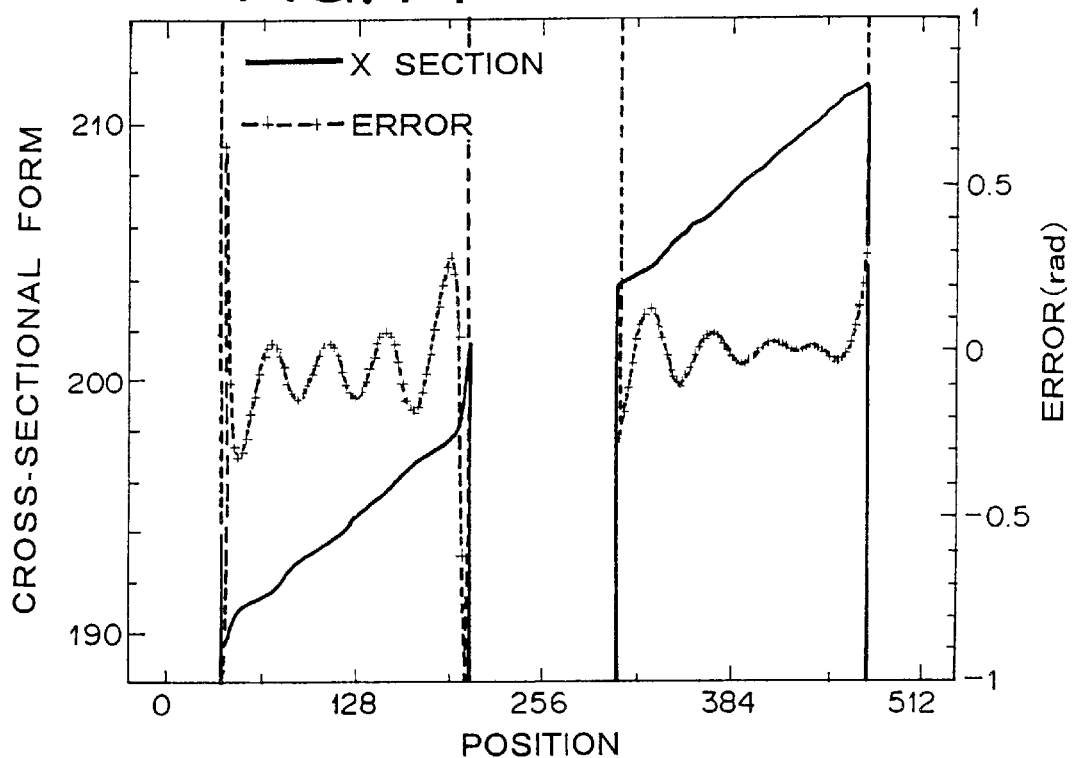
FIG. 14 is a graph showing the form of an X cross-sectional form obtained when the image data shown in FIG. 12 is subjected to Fourier transform processing as it is, and the error from the actual form in this case.
Figure 15:
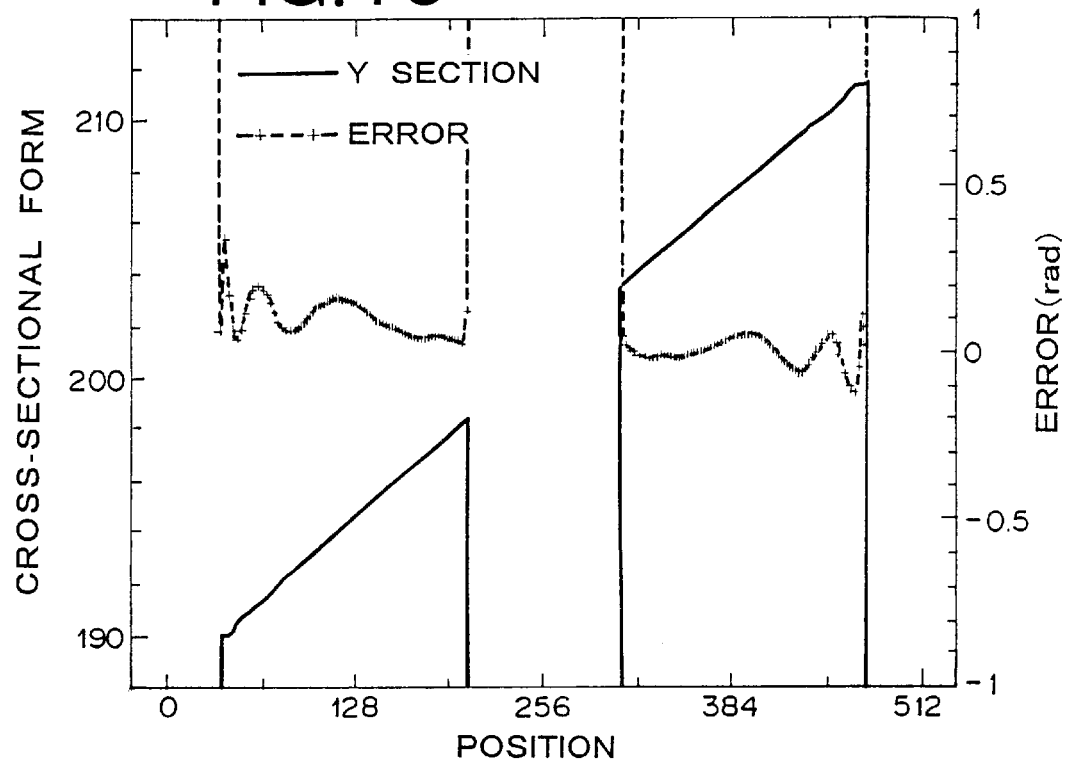
FIG. 15 is a graph showing the form of a Y cross-sectional form obtained when the image data shown in FIG. 12 is subjected to Fourier transform processing as it is, and the error from the actual form in this case.

FIGS. 14 and 15 show X and Y cross-sectional forms obtained when the image data shown in FIG. 12 is subjected to Fourier transform processing as it is, respectively, and the respective errors from the actual form in this case.

Figure 16:
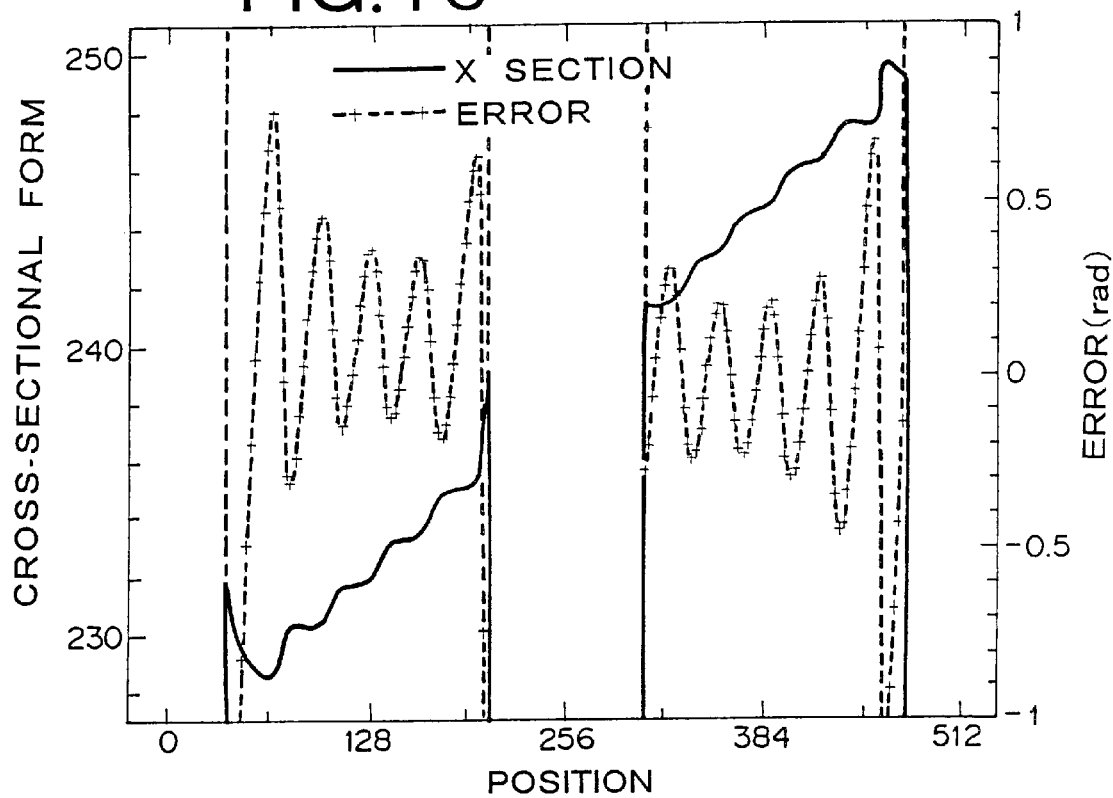
FIG. 16 is a graph showing the form of an X cross-sectional form obtained when the image data shown in FIG. 12 is subjected to Fourier transform processing after being multiplied by an X-Y directional total ring window function, and the error from the actual form in this case.
Figure 17:
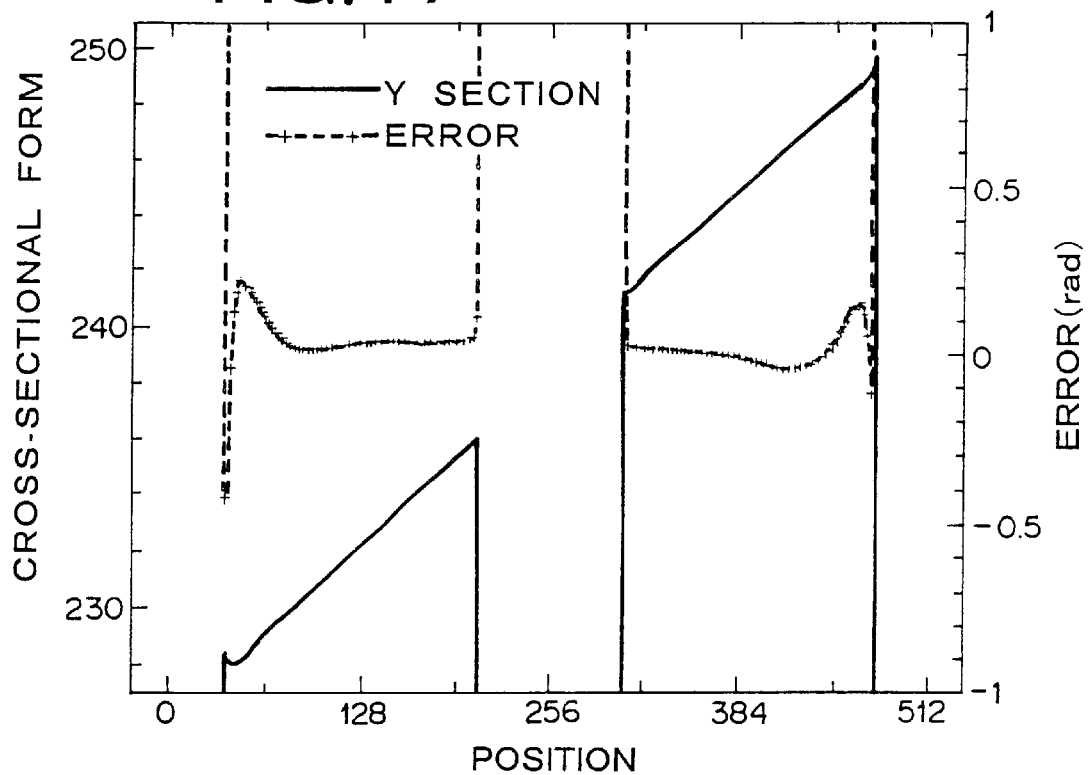
FIG. 17 is a graph showing the form of a Y cross-sectional form obtained when the image data shown in FIG. 12 is subjected to Fourier transform processing after being multiplied by the X-Y directional total ring window function, and the error from the actual form in this case.
Figure 18:
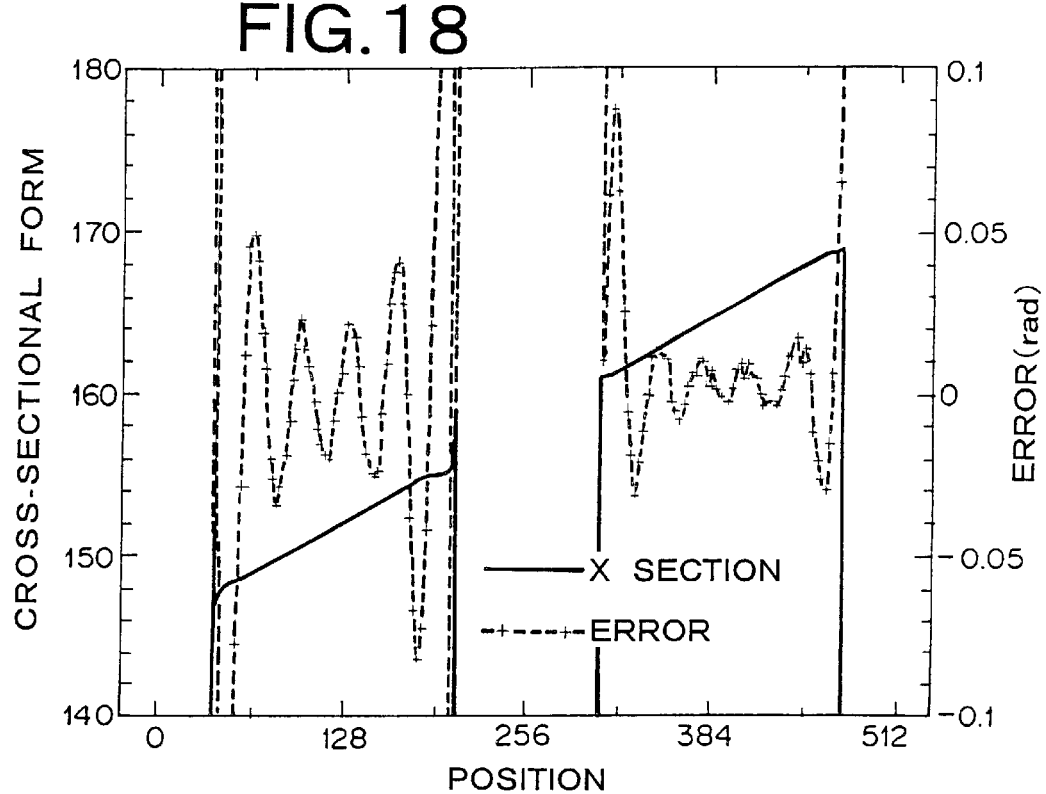
FIG. 18 is a graph showing the form of an X cross-sectional form obtained when the image data shown in FIG. 12 is subjected to Fourier transform processing after being multiplied by a radial total ring window function, and the error from the actual form in this case.
Figure 19:
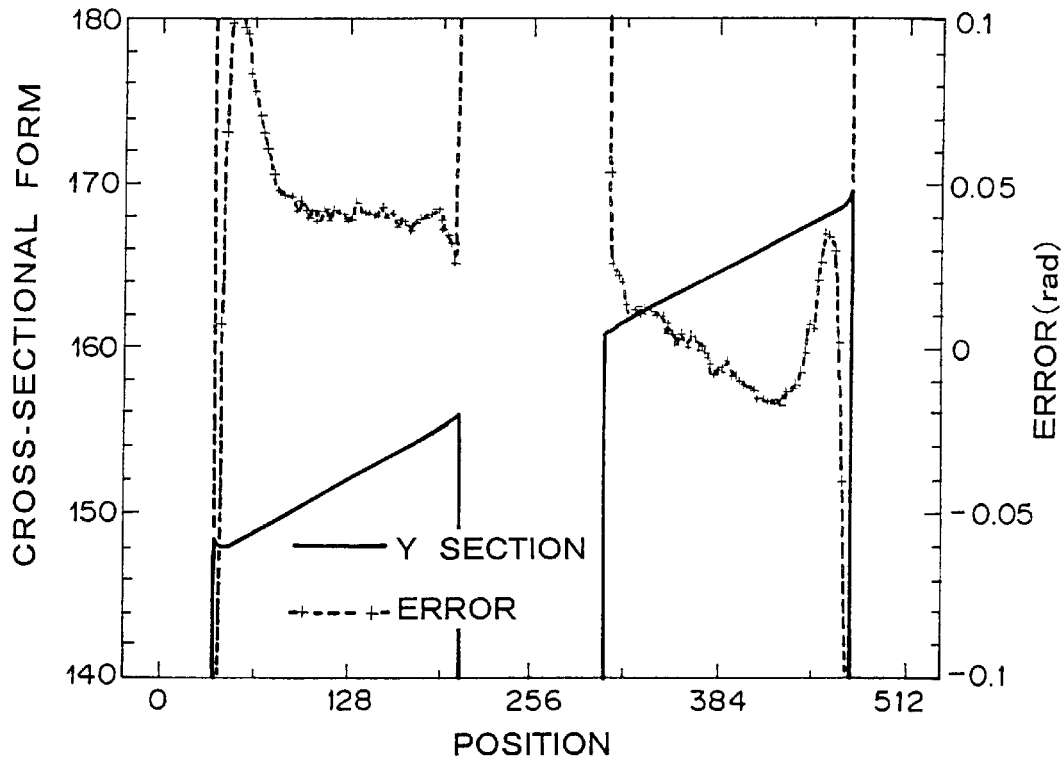
FIG. 19 is a graph showing the form of a Y cross-sectional form obtained when the image data shown in FIG. 12 is subjected to Fourier transform processing after being multiplied by the radial total ring window function, and the error from the actual form in this case.
Figure 20:
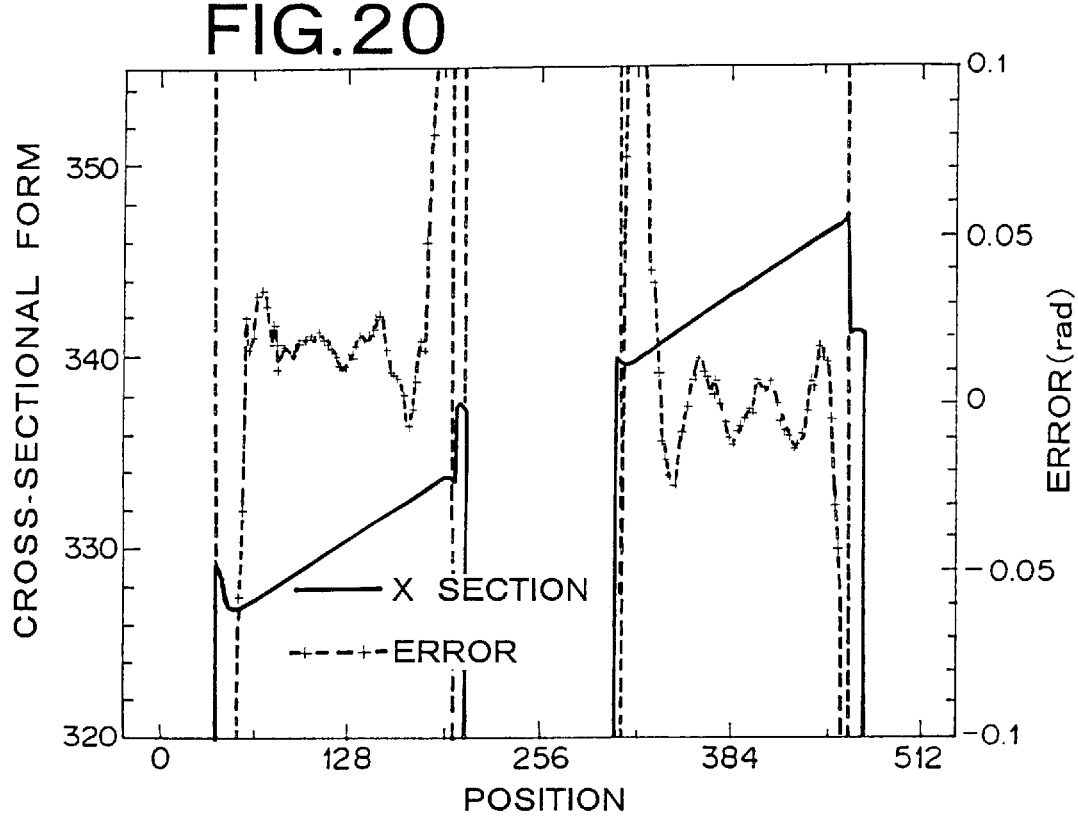
FIG. 20 is a graph showing the form of an X cross-sectional form obtained when the image data shown in FIG. 12 is subjected to Fourier transform processing after being multiplied by a radial partial ring window function, and the error from the actual form in this case.
Figure 21:
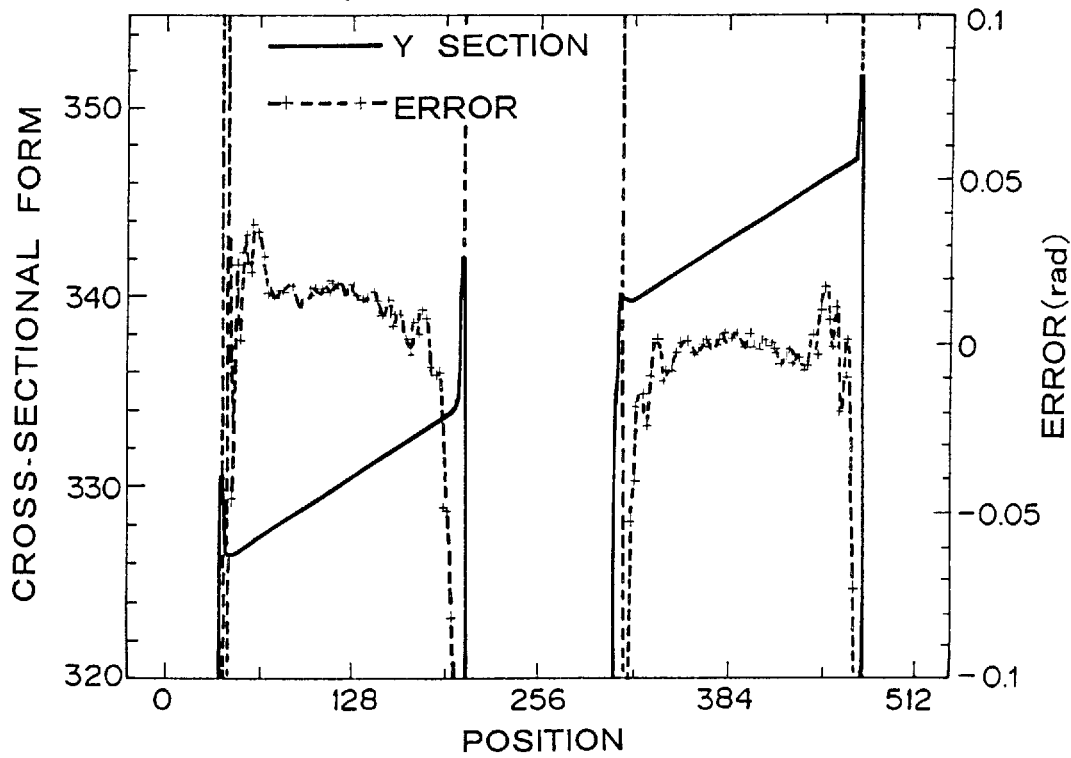
FIG. 21 is a graph showing the form of a Y cross-sectional form obtained when the image data shown in FIG. 12 is subjected to Fourier transform processing after being multiplied by the radial partial ring window function, and the error from the actual form in this case.

FIGS. 16 and 17 show X and Y cross-sectional forms analyzed after the interference fringe image data of the above-mentioned ring-shaped object to be observed is multiplied by an X-Y directional total ring window function, respectively, and the respective errors from the actual form in this case. FIGS. 18 and 19 show X and Y cross-sectional forms analyzed after the interference fringe image data of the above-mentioned ring-shaped object to be observed is multiplied by a radial total ring window function, respectively, and the respective errors from the actual form in this case. FIGS. 20 and 21 show X and Y cross-sectional forms analyzed after the interference fringe image data of the above-mentioned ring-shaped object to be observed is multiplied by a radial partial ring window function, respectively, and the respective errors from the actual form in this case. Here, the total ring window function refers to a ring-shaped window function having a form including the ineffective area on the outside of the ring-shaped effective area, whereas the partial ring-shaped window function is a ring-shaped window function having a form coinciding with the ring-shaped effective area.

For reducing the total error, as can be seen from the above-mentioned graphs, it is the most effective to carry out analysis after the interference fringe image data of the ring-shaped object to be observed is multiplied by the radial partial ring window function.

Figure 22:
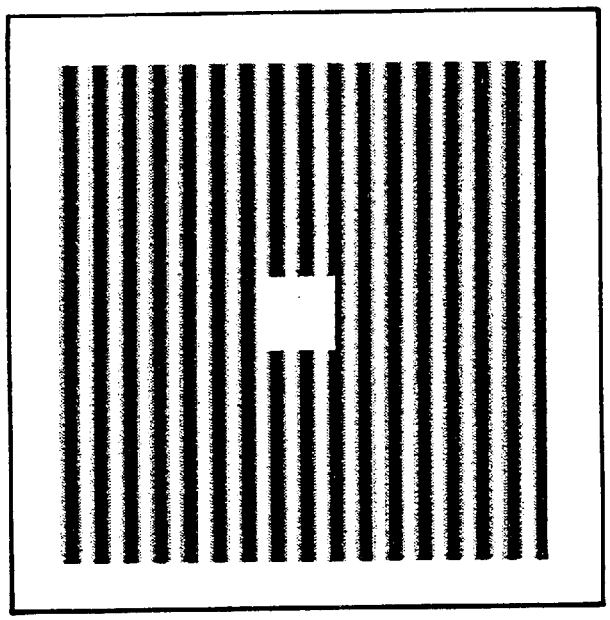
FIG. 22 is a schematic view showing interference fringe image data (having a quadrangular form with a quadrangular opening at its center) of an object to be observed.
Figure 23:
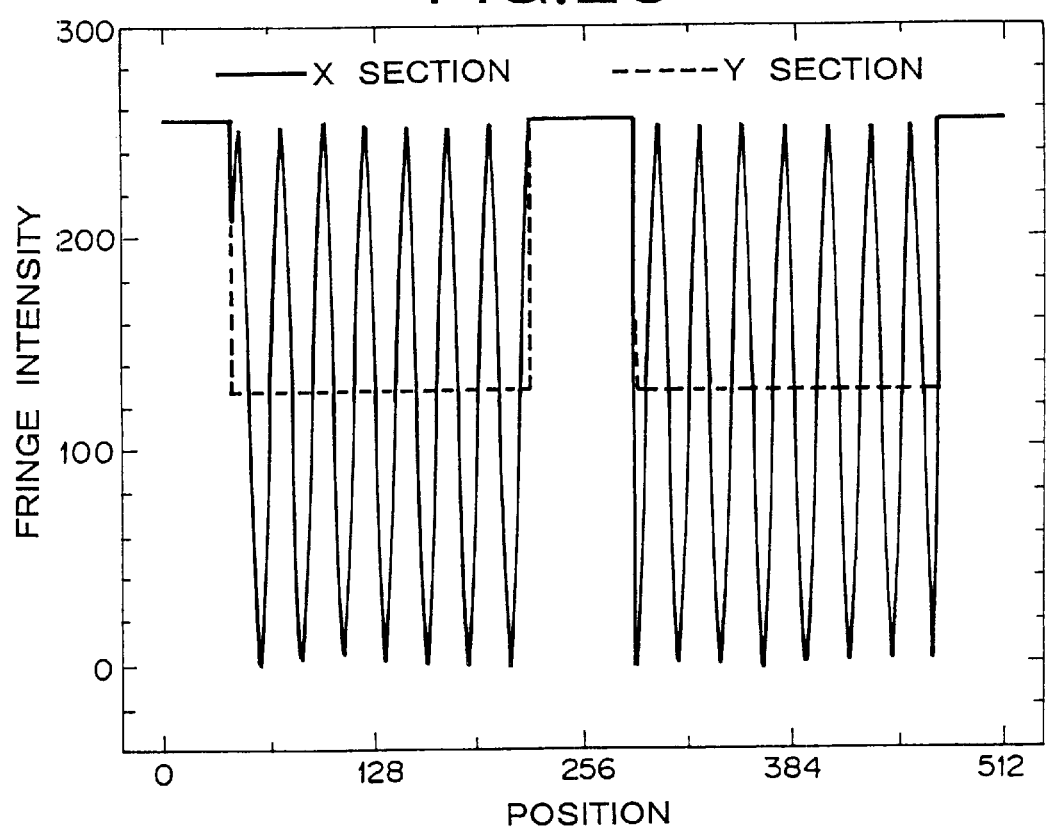
FIG. 23 is a graph showing a sectional interference fringe intensity distribution with respect to the image data shown in FIG. 22.

While the ring-shaped window function is effective in analyzing interference fringe image data of a circular ring-shaped object to be observed as mentioned above, it is also effective in analyzing interference image data of a square (rectangular) object having a square (rectangular) opening at its center part as shown in FIG. 22 (FIG. 23 showing the intensity distribution in interference fringes in X and Y cross sections).

FIGS. 24 and 25 show X and Y cross-sectional forms obtained when the image data shown in FIG. 22 is subjected to Fourier transform processing as it is, respectively, and the respective errors from the actual form in this case.

Figure 26:
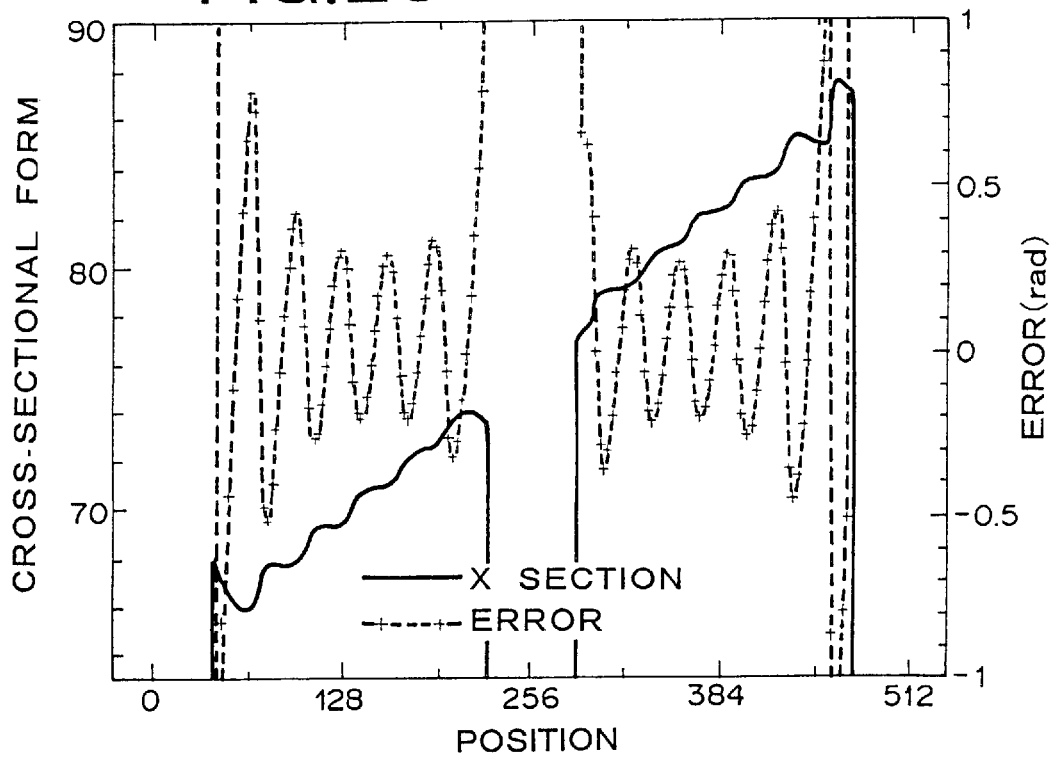
FIG. 26 is a graph showing the form of an X cross-sectional form obtained when the image data shown in FIG. 22 is subjected to Fourier transform processing after being multiplied by an X-Y directional total ring window function, and the error from the actual form in this case.
Figure 27:
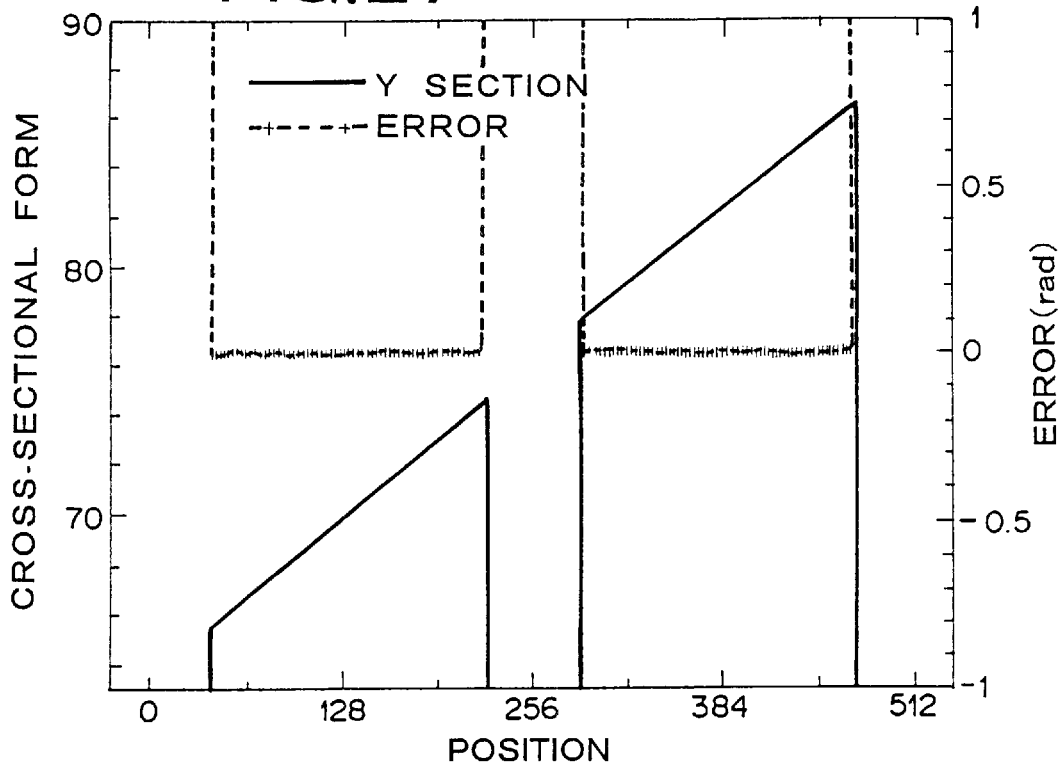
FIG. 27 is a graph showing the form of a Y cross-sectional form obtained when the image data shown in FIG. 22 is subjected to Fourier transform processing after being multiplied by the X-Y directional total ring window function, and the error from the actual form in this case.
Figure 28:
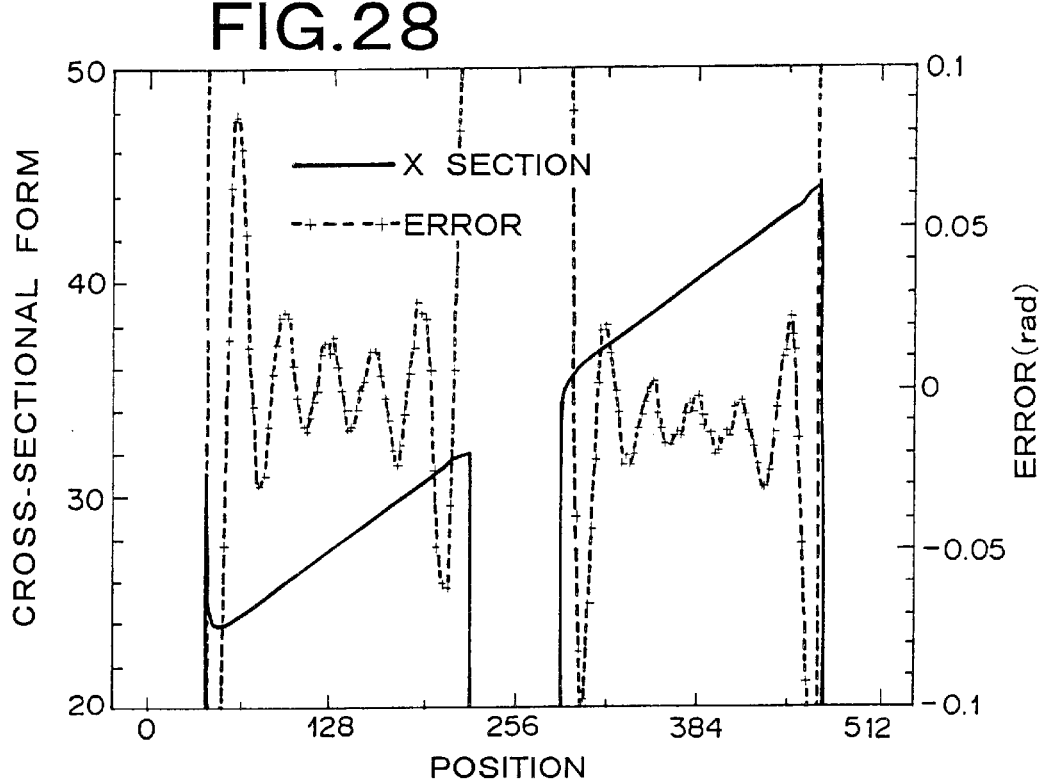
FIG. 28 is a graph showing the form of an X cross-sectional form obtained when the image data shown in FIG. 22 is subjected to Fourier transform processing after being multiplied by a radial total ring window function, and the error from the actual form in this case.
Figure 29:
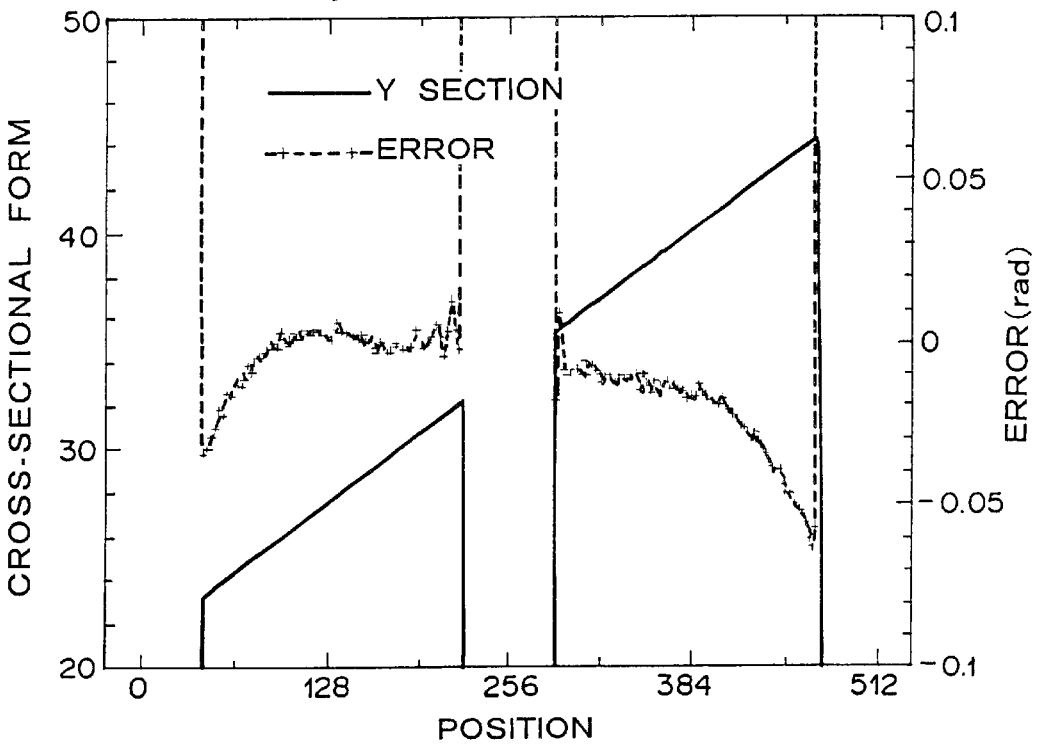
FIG. 29 is a graph showing the form of a Y cross-sectional form obtained when the image data shown in FIG. 22 is subjected to Fourier transform processing after being multiplied by the radial total ring window function, and the error from the actual form in this case.
Figure 30:
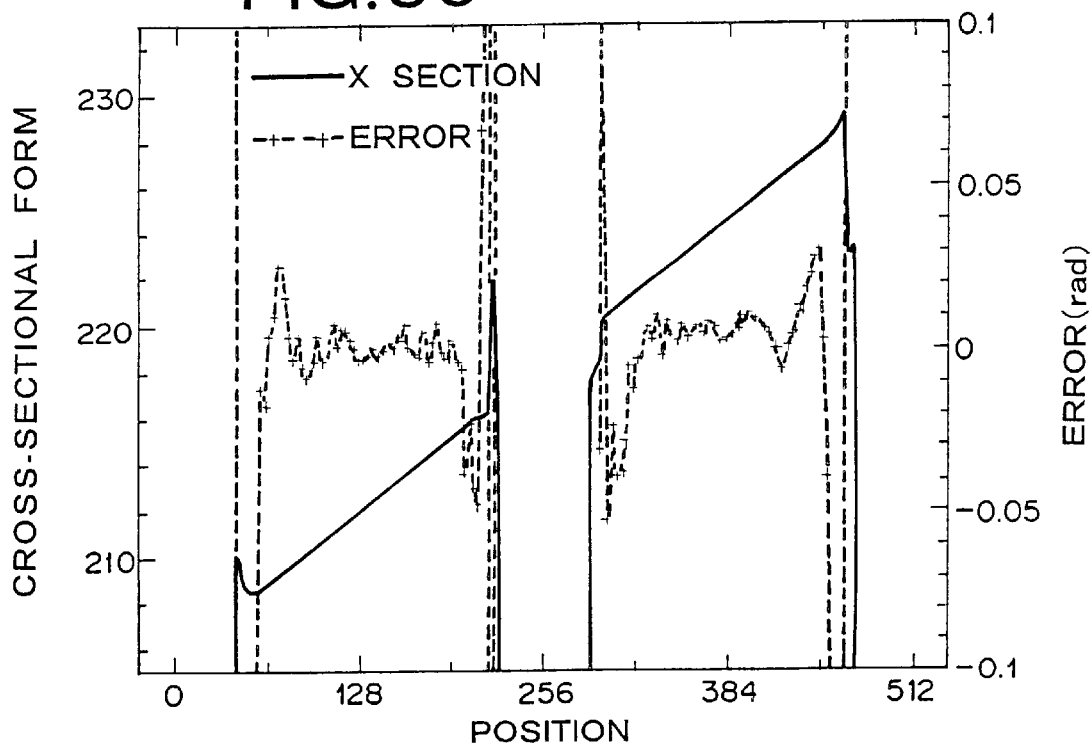
FIG. 30 is a graph showing the form of an X cross-sectional form obtained when the image data shown in FIG. 22 is subjected to Fourier transform processing after being multiplied by an X-Y directional partial ring window function, and the error from the actual form in this case.
Figure 31:
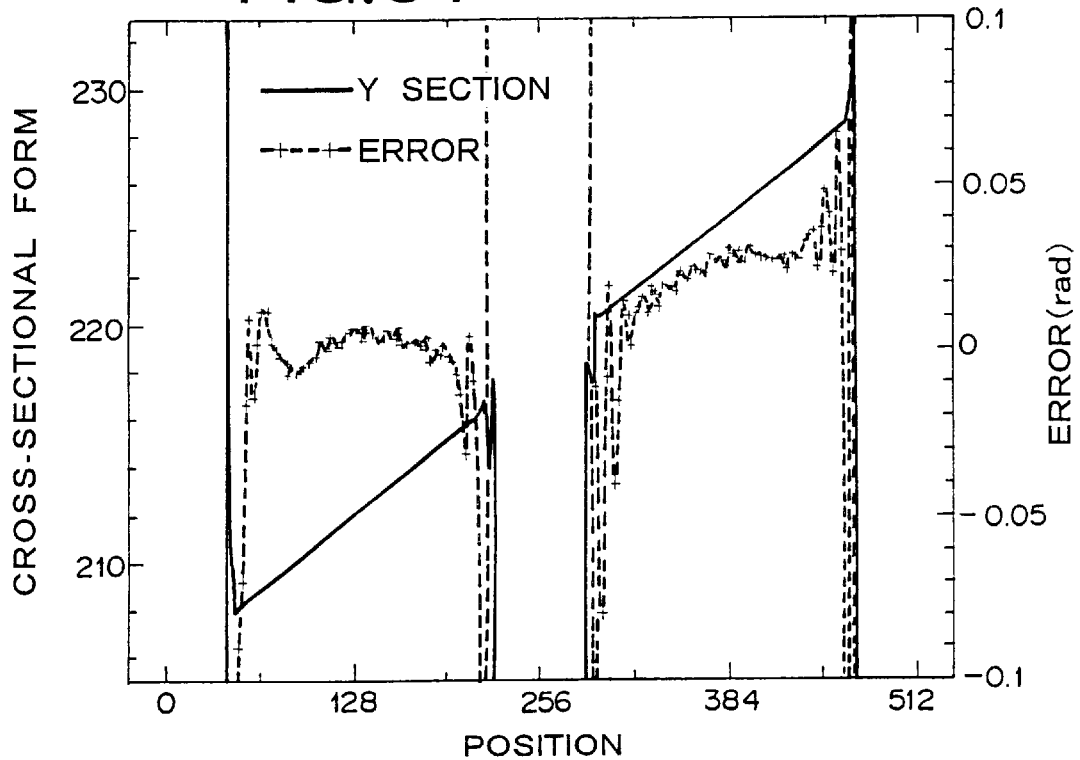
FIG. 31 is a graph showing the form of a Y cross-sectional form obtained when the image data shown in FIG. 22 is subjected to Fourier transform processing after being multiplied by the X-Y directional partial ring window function, and the error from the actual form in this case.

FIGS. 26 and 27 show X and Y cross-sectional forms analyzed after the interference fringe image data of the above-mentioned square (rectangular) object to be observed having a square (rectangular) opening at the center part is multiplied by an X-Y directional total ring window function, respectively, and the respective errors from the actual form in this case. FIGS. 28 and 29 show X and Y cross-sectional forms analyzed after the interference fringe image data of the above-mentioned square (rectangular) object to be observed having a square (rectangular) opening at the center part is multiplied by a radial total ring window function, respectively, and the respective errors from the actual form in this case. FIGS. 30 and 31 show X and Y cross-sectional forms analyzed after the interference fringe image data of the above-mentioned square (rectangular) object to be observed having a square (rectangular) opening at the center part is multiplied by an X-Y directional partial ring window function, respectively, and the respective errors from the actual form in this case.

For reducing the total error, as can be seen from the above-mentioned graphs, it is the most effective to carry out analysis after the interference fringe image data of the square (rectangular) object to be observed having a square (rectangular) opening at the center part thereof is multiplied by the X-Y directional partial ring window function.

Figure 1:
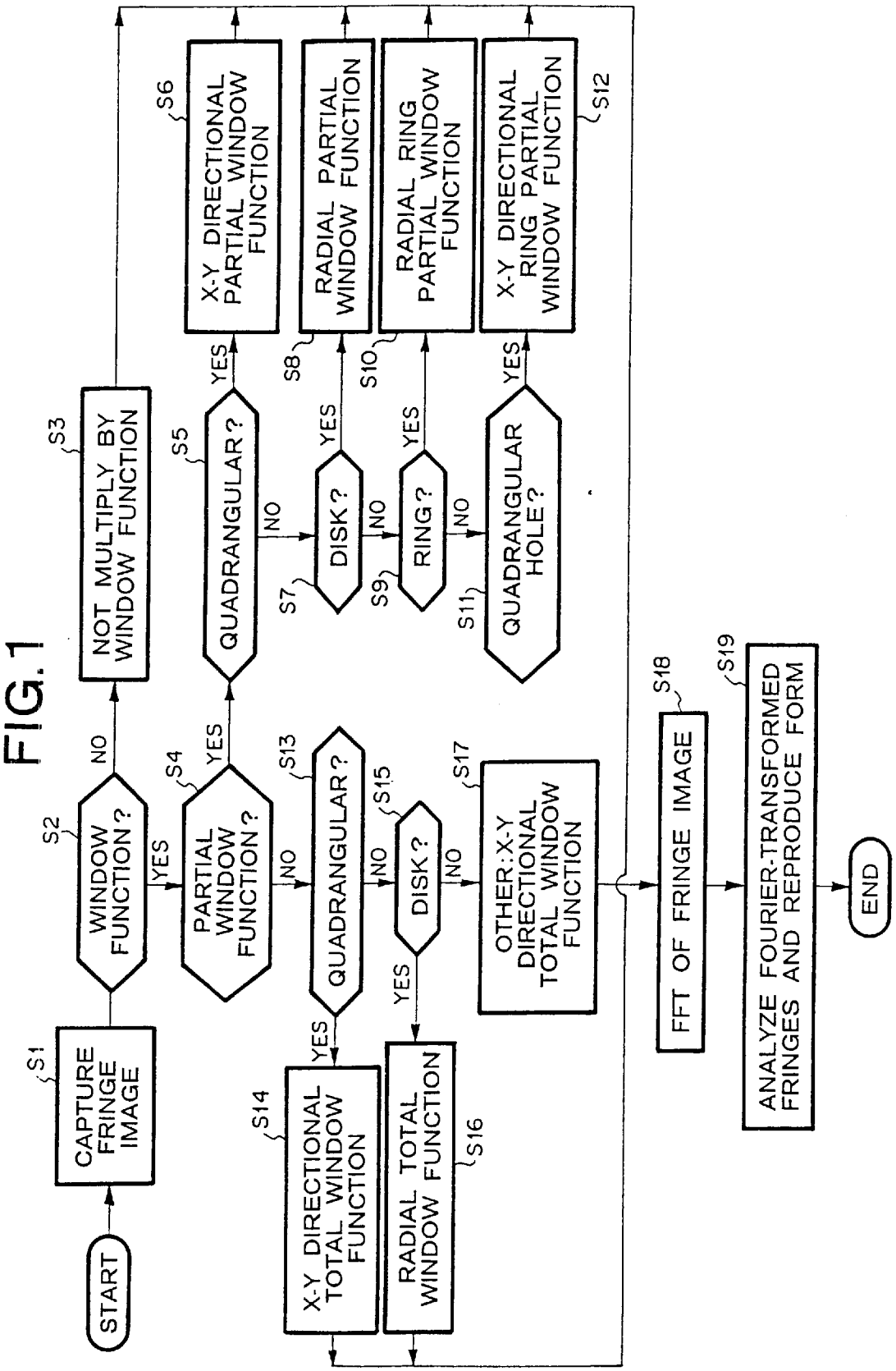
FIG. 1 is a flowchart for explaining an embodiment of the present invention.

In the following, this embodiment will be explained with reference to the flowchart shown in FIG. 1.

Figure 32:
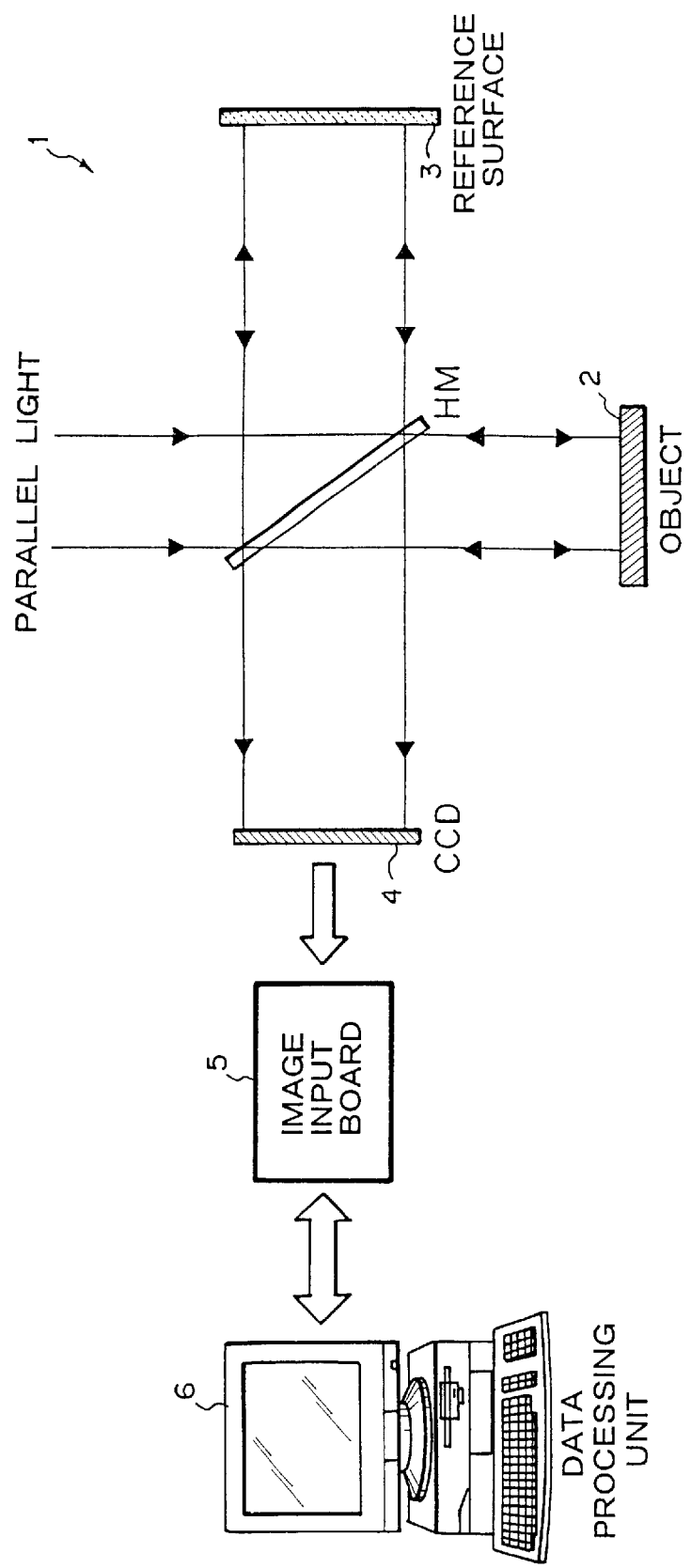
FIG. 32 is a schematic view showing an example of system for carrying out the method in accordance with an embodiment of the present invention.

In a Michelson type interferometer 1 shown in FIG. 32, interference fringes formed by respective reflected lights from a wavefront of an object 2 and a reference surface 3 are captured by a CCD camera 4 by way of an input optical system, which is not depicted, and are displayed on a monitor screen 6 by way of an image input board 5. The interference fringe image data output from the CCD camera 4 is stored into a memory due to processing performed by a CPU which is not depicted.

Here, while the monitor screen 6 is being observed, the position of the wavefront of the object to be observed is adjusted such that the center of fringes is located at the center of screen. Thereafter, an interference fringe image formed on the CCD camera 4 is captured upon photoelectric conversion, and the resulting data is stored into the memory (S1).

Subsequently, it is determined whether to multiply the data by a window function or not. If it is determined not (S3), then Fourier transform processing of the fringe image is carried out immediately (S18). If it is determined that the data should be multiplied by a window function, then it is determined whether a partial window function is taken as the window function or not (S4). If it is determined to be a partial window function, then it is determined according to the form of interference fringe image data of the object whether quadrangular (rectangular) one (S5), disk-shaped one (S7), ring-shaped one (S9), or quadrangular one having a quadrangular opening at the center (S11) is to be employed.

If it is determined to employ the quadrangular (rectangular) one, then the interference fringe image data is multiplied by a quadrangular X-Y directional partial window function (S6), and the fringe image is subjected to Fourier transform processing (S18). If it is determined to employ the disk-shaped one, then the interference fringe data is multiplied by a disk-shaped radial partial window function (S8), and the fringe image is subjected to Fourier transform processing (S18). If it is determined to employ the ring-shaped one, then the interference fringe image data is multiplied by a ring-shaped radial partial window function (S10), and the fringe image is subjected to Fourier transform processing (S18). If it is determined to employ the quadrangular one having a quadrangular opening at the center, then the interference image data is multiplied by an X-Y directional ring-shaped partial window function (S12), and the fringe image is subjected to Fourier transform processing (S18).

If it is determined at the above-mentioned step 4 (S4) that no partial window function be chosen, then a total window function is to be selected. Hence, according to the form of interference fringe image data of the object, it is determined whether quadrangular (rectangular) one (S13), disk-shaped one (S15), or those having other forms are to be employed.

If it is determined to employ the quadrangular (rectangular) one, then the interference fringe image data is multiplied by a quadrangular X-Y directional total window function (S14), and the fringe image is subjected to Fourier transform processing (S18). If it is determined to employ the disk-shaped one, then the interference fringe image data is multiplied by a disk-shaped radial total window function (S16), and the fringe image is subjected to Fourier transform processing (S18). If it is determined to employ those having other forms, then the interference image data is multiplied by an X-Y directional total window function (S17), and the fringe image is subjected to Fourier transform processing (S18).

After the fringe image is subjected to Fourier transform processing at the above-mentioned step 18 (S18), the Fourier-transformed fringes are analyzed, and the form of the object to be observed is reproduced (S19).

As the window function, various known types are employable. By way of example, Bartlett (triangular), Hanning, Hamming, and Backman window functions are shown in the following.

Bartlett (triangular) window function:

$$w(n) = \begin{cases} \dfrac{2n}{L-1} & 0 \le n < \dfrac{L-1}{2} \\ 2 - \dfrac{2n}{L-1} & \dfrac{L-1}{2} \le n < L-1 \end{cases}$$

Hanning window function:

$$w(n) = \dfrac{1}{2}\left[1 - \cos\left(\dfrac{2\pi n}{L-1}\right)\right]$$

where $0 \le n \le L-1$.

Hamming window function $$w(n) = 0.54 - 0.46\cos\left(\dfrac{2\pi n}{L-1}\right)$$

where $0 \le n \le L-1$.

Backman window function:

$$w(n) = 0.42 - 0.5\cos\left(\dfrac{2\pi n}{L-1}\right) + 0.08\cos\left(\dfrac{4\pi n}{L-1}\right)$$

where $0 \le n \le L-1$.

Here, rectangular window functions which multiply desirable and other areas by coefficients of 0 and 1, respectively, are not included in the window function in the present invention.

The fringe analysis method using Fourier transform in accordance with the present invention is not restricted to that of the above-mentioned embodiment, and can be modified in various manners. The kinds of partial and total window functions are not limited to those mentioned above, and triangular ones or quadrangular or higher polygonal ones can be selected according to the form (wavefront) of the object to be observed, for example. Also, in response to interference fringe image data in which two or more ineffective areas are disposed within an effective area, a window function having a matching form can be employed.

While the interference image data is captured by use of a Michelson type interferometer in the above-mentioned embodiment, the present invention is similarly applicable to interference fringe image data obtained by use of other interferometers such as those of Fizeau type as a matter of course.

Further, the method of the present invention is applicable not only to interference fringes but also to moiré fringes, speckle fringes, and other various kinds of fringe images.

Furthermore, the method of the present invention is applicable not only to surface form of the object but also to the other various kind of phase or wavefront to be observed.

In the fringe analysis method using Fourier transform in accordance with the present invention, fringe image data is multiplied by a window function corresponding to an effective data area before carrying out Fourier transform method, so that Fourier transform method can be carried out with respect to data in a state where form characteristics of the effective data area are superimposed, whereby results of analysis of the effective data area can be made favorable as a whole with less errors.

For example, results of analysis of the effective data area can be made favorable as a whole with less errors if an X-Y directional window function is chosen when analyzing interference fringes of a rectangular object to be observed, and if a radial window function is chosen when analyzing interference fringes of a disk-shaped object to be observed.

If a partial window function having a form corresponding to that of an effective data area is chosen, then results of analysis of the effective data area can be made favorable as a whole with less errors than those in the case where a total window function is selected.

In the fringe analysis of a wavefront of an object to be observed having an ineffective data area at the center part thereof, such as ring-shaped one, if a ring-shaped window function excluding the part corresponding to the ineffective data area at the center is applied thereto, then results of analysis of the effective data area can be made favorable as a whole with less errors.

What is claimed is:

1. A fringe analysis method using Fourier transform, said fringe analysis method comprising the step of subjecting fringe image data carrying wavefront information of an object to be observed to Fourier transform method so as to determine a wavefront of said object;

wherein, before carrying out said Fourier transform method, said fringe image data is multiplied by a window function corresponding to an effective data area of said fringe image data.

2. A fringe analysis method according to claim 1, wherein said wavefront information is form information of said object.

3. A fringe analysis method according to claim 2, wherein, when said fringe image data is two-dimensional image data having a rectangular form, said window function is set to a function represented by variables indicating respective positions in two directions orthogonal to each other.

4. A fringe analysis method according to claim 2, wherein, when said fringe image data is two-dimensional image data having a circular form, said window function is set to a function represented by a variable indicating a radial position from a center which is located at substantially the center position of said circular form.

5. A fringe analysis method according to claim 2, wherein said fringe image data is interference fringe image data.

6. A fringe analysis method according to claim 1, wherein said fringe image data is interference fringe image data.

7. A fringe analysis method according to claim 1, wherein said window function has a form corresponding to that of said effective data area.

8. A fringe analysis method according to claim 7, wherein, when said effective data area of said fringe image data has a form surrounding an ineffective data area, said window function is set to a partial window function having a form corresponding to that of said effective data area.

9. A fringe analysis method according to claim 8, wherein said partial window function is a ring type window function having a ring shape.

10. A fringe analysis method according to claim 7, wherein said fringe image data is interference fringe image data.

* * * * *